(12) United States Patent
Kanno

(10) Patent No.: US 8,384,248 B2
(45) Date of Patent: Feb. 26, 2013

(54) POWER CONTROL APPARATUS AND ELECTRONIC APPLIANCE EQUIPPED WITH POWER CONTROL APPARATUS

(75) Inventor: Masayoshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 12/276,734

(22) Filed: Nov. 24, 2008

(65) Prior Publication Data

US 2009/0146498 A1 Jun. 11, 2009

(30) Foreign Application Priority Data

Dec. 5, 2007 (JP) ................................. 2007-315215

(51) Int. Cl.
*H02M 3/06* (2006.01)
*H01H 35/00* (2006.01)
(52) U.S. Cl. ........................................ 307/109; 307/120
(58) Field of Classification Search .................. 307/109, 307/120
See application file for complete search history.

(56) References Cited

U.S. PATENT DOCUMENTS

| | | | | |
|---|---|---|---|---|
| 1,960,415 A * | 5/1934 | Miller, Jr. | ....................... | 307/105 |
| 3,075,146 A * | 1/1963 | Wood | ........................... | 324/99 R |
| 4,701,827 A * | 10/1987 | Fujikawa et al. | ............... | 361/309 |
| 5,652,423 A * | 7/1997 | Saitoh et al. | .................... | 235/492 |
| 5,892,198 A * | 4/1999 | Barnes et al. | ............. | 219/121.54 |
| 5,901,031 A * | 5/1999 | Ishige et al. | ................... | 361/277 |
| 6,013,958 A * | 1/2000 | Aytur | ............................. | 307/109 |
| 6,040,744 A * | 3/2000 | Sakurai et al. | ................. | 331/176 |
| 6,160,441 A * | 12/2000 | Stratakos et al. | .............. | 327/540 |
| 6,441,449 B1 * | 8/2002 | Xu et al. | ......................... | 257/414 |
| 6,549,765 B2 * | 4/2003 | Welland et al. | ................ | 455/260 |
| 6,667,506 B1 * | 12/2003 | Reedy et al. | .................... | 257/314 |
| 6,952,337 B2 * | 10/2005 | Yashima | ........................ | 361/277 |
| 7,495,529 B2 * | 2/2009 | Miyaguchi et al. | ............ | 333/164 |
| 2003/0223176 A1 * | 12/2003 | Fujii et al. | ...................... | 361/277 |
| 2004/0222701 A1 * | 11/2004 | Kugelman | ..................... | 307/131 |
| 2007/0209176 A1 * | 9/2007 | Kawakubo et al. | ........... | 29/25.35 |
| 2007/0242411 A1 | 10/2007 | Kanno | | |
| 2008/0238402 A1 | 10/2008 | Kanno | | |

FOREIGN PATENT DOCUMENTS

JP 62-259417 11/1987
JP 2007-236182 9/2007

OTHER PUBLICATIONS

JP 2008066682 to Nakajima et al., english translation, Mar. 21, 2008.*
JP 2007236182 to Kanno, english translation, Sep. 13, 2007.*
Office Action issued Jan. 17, 2012, in Japanese Patent Application No. 2007-315215, filed Dec. 5, 2007.

* cited by examiner

*Primary Examiner* — Hal Kaplan
(74) *Attorney, Agent, or Firm* — Oblon, Spivak, McClelland, Maier & Neustadt, L.L.P.

(57) ABSTRACT

A power control apparatus includes an input terminal and an output terminal for an AC signal; a DC removing capacitor connected between the input terminal and the output terminal; and a variable capacitor that is connected between the input terminal and the output terminal and whose capacitance can be changed by a control signal. One of a current and a voltage of the AC signal is controlled by changing the capacitance of the variable capacitor using the control signal, and dielectrics that form a serially connected row of capacitors composed of the DC removing capacitor and the variable capacitor are configured so as to be integrally laminated, and the control signal is applied across a dielectric that forms the variable capacitor and the AC signal is applied across the dielectrics that form the row of capacitors.

6 Claims, 14 Drawing Sheets

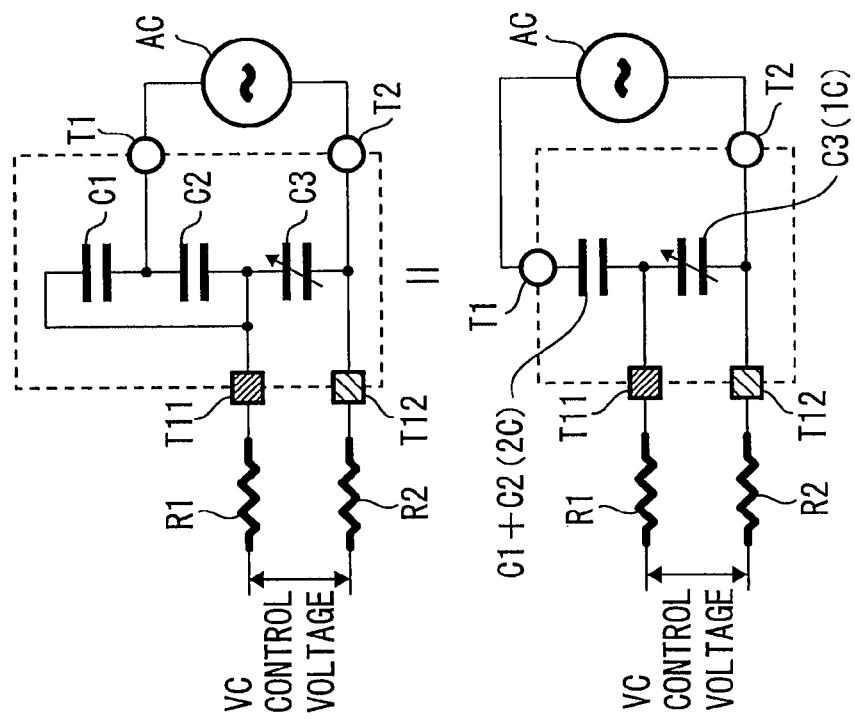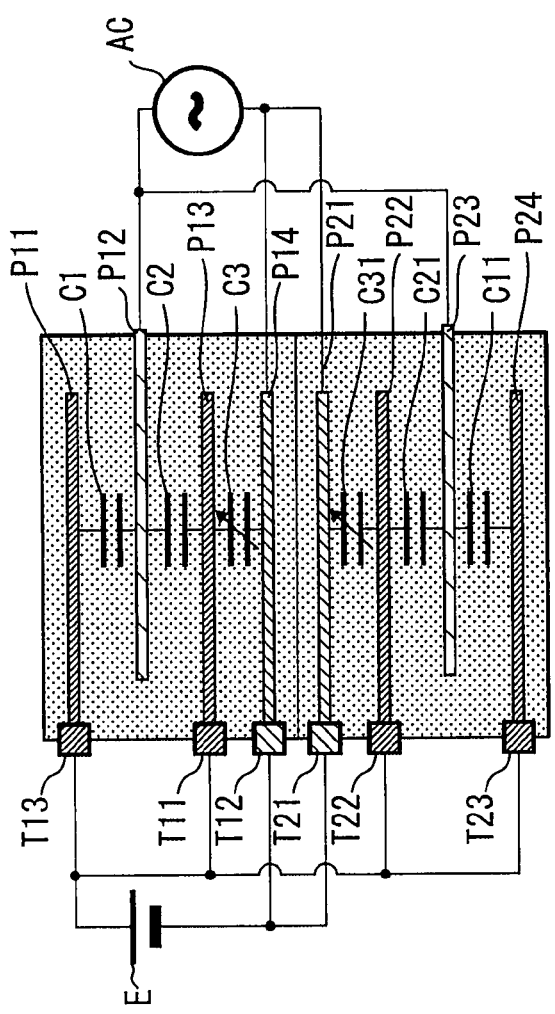

FIG. 6A

CHANGE IN CAPACITANCE: 10

| | EXAMPLE 1 | | EXAMPLE 2 | | EXAMPLE 3 | |
|---|---|---|---|---|---|---|
| | max | min | max | min | max | min |
| FIXED CAPACITOR C1 | 1.0 | 1.0 | 10.0 | 10.0 | 1.0 | 1.0 |
| VARIABLE CAPACITOR C2 | 1.0 | 0.1 | 1.0 | 0.10 | 10.0 | 1.0 |
| COMBINED WITHSTAND VOLTAGE V | 2.0 | 1.1 | 1.1 | 1.0 | 11.0 | 2.0 |
| COMBINED CAPACITANCE C | 0.50 | 0.09 | 0.91 | 0.10 | 0.91 | 0.50 |
| CHANGE IN COMBINED CAPACITANCE | 5.5 | | 9.2 | | 1.8 | |

FIG. 6B

CHANGE IN CAPACITANCE: 3

| | EXAMPLE 1 | | EXAMPLE 2 | | EXAMPLE 3 | |
|---|---|---|---|---|---|---|
| | max | min | max | min | max | min |
| FIXED CAPACITOR C1 | 1.0 | 1.0 | 10.0 | 10.0 | 1.0 | 1.0 |
| VARIABLE CAPACITOR C2 | 1.0 | 0.3 | 1.0 | 0.33 | 10.0 | 3.3 |
| COMBINED WITHSTAND VOLTAGE V | 2.0 | 1.3 | 1.1 | 1.0 | 11.0 | 4.3 |
| COMBINED CAPACITANCE C | 0.50 | 0.25 | 0.91 | 0.32 | 0.91 | 0.77 |
| CHANGE IN COMBINED CAPACITANCE | 2.0 | | 2.8 | | 1.2 | |

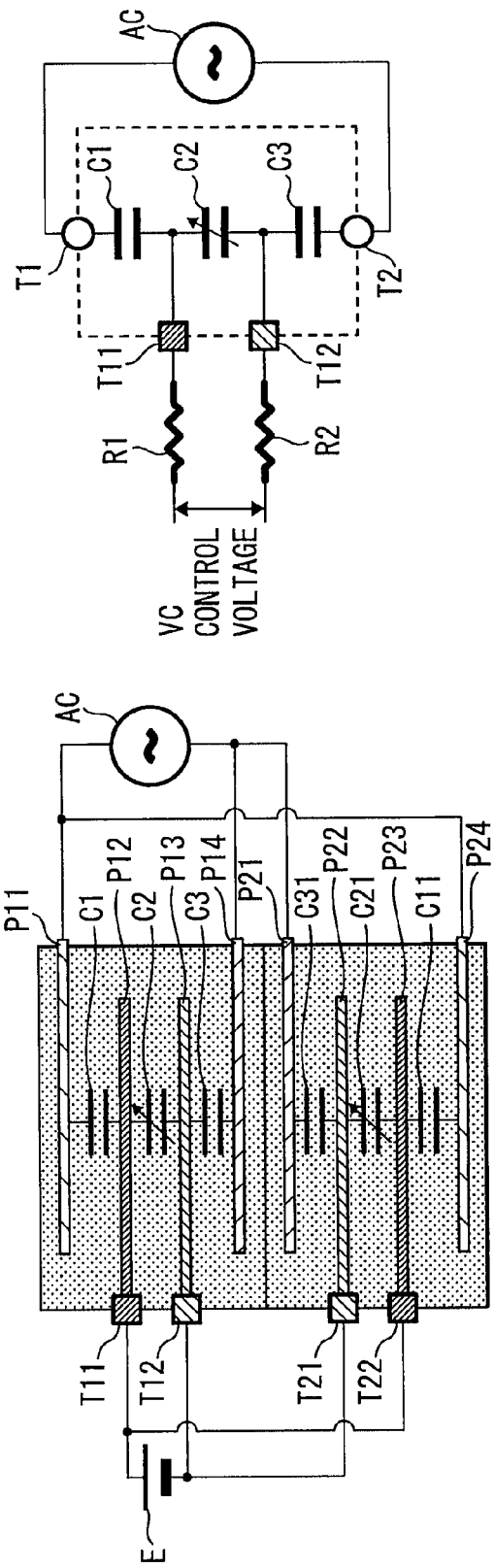

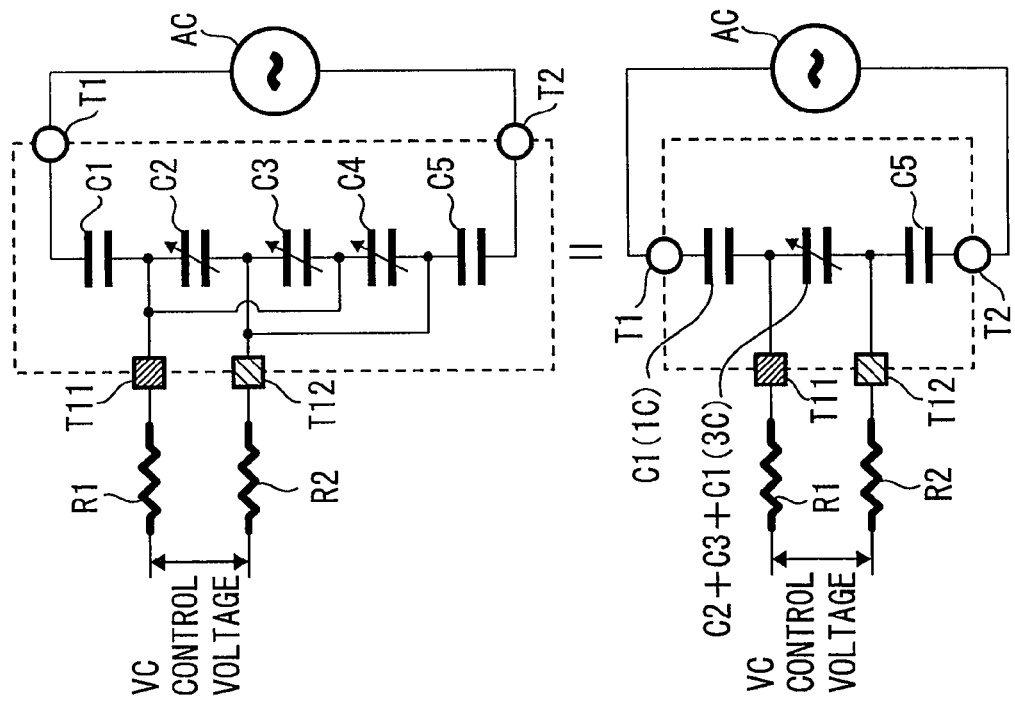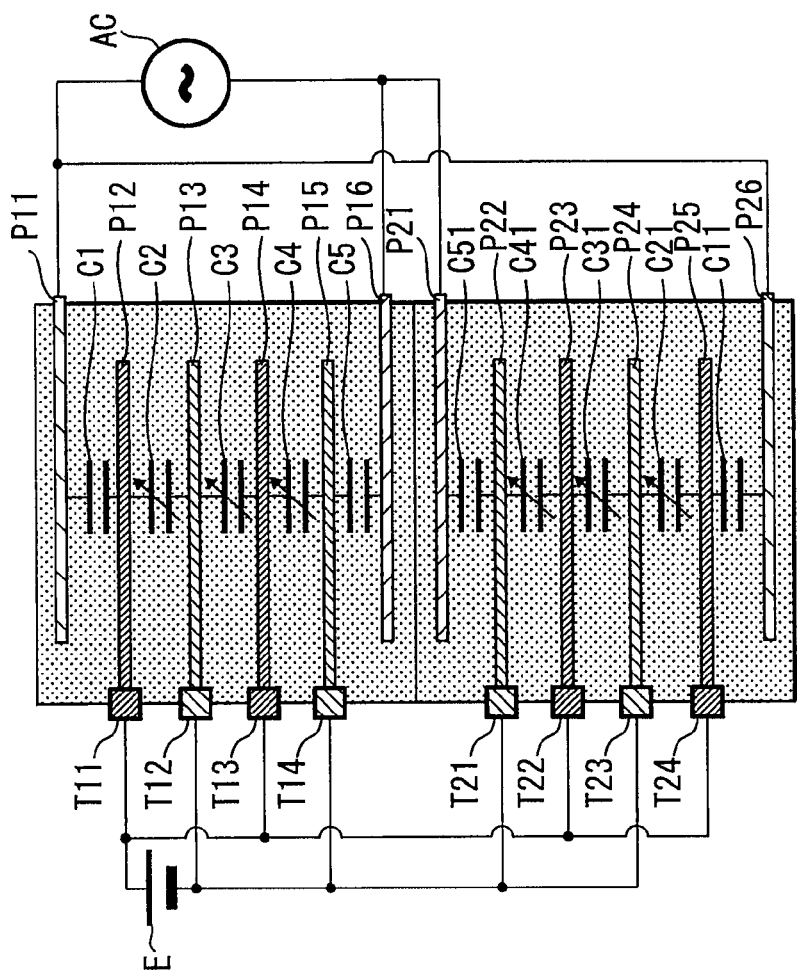

FIG. 10A

CHANGE IN CAPACITANCE: 10

| | EXAMPLE 1 | | EXAMPLE 2 | | EXAMPLE 3 | |
|---|---|---|---|---|---|---|
| | max | min | max | min | max | min |
| FIXED CAPACITOR C1 | 1.0 | 1.0 | 10.0 | 10.0 | 1.0 | 1.0 |
| VARIABLE CAPACITOR C2 | 1.0 | 0.1 | 1.0 | 0.1 | 10.0 | 1.0 |
| FIXED CAPACITOR C3 | 1.0 | 1.0 | 10.0 | 10.0 | 1.0 | 1.0 |
| COMBINED WITHSTAND VOLTAGE V | 3.0 | 1.2 | 1.2 | 1.0 | 21.0 | 3.0 |
| COMBINED CAPACITANCE C | 0.33 | 0.08 | 0.83 | 0.10 | 0.48 | 0.33 |
| CHANGE IN COMBINED CAPACITANCE | | 4.0 | | 8.5 | | 1.4 |

FIG. 10B

CHANGE IN CAPACITANCE: 3

| | EXAMPLE 1 | | EXAMPLE 2 | | EXAMPLE 3 | |
|---|---|---|---|---|---|---|
| | max | min | max | min | max | min |
| FIXED CAPACITOR C1 | 1.0 | 1.0 | 10.0 | 10.0 | 1.0 | 1.0 |
| VARIABLE CAPACITOR C2 | 1.0 | 0.3 | 1.0 | 0.3 | 10.0 | 3.3 |
| FIXED CAPACITOR C3 | 1.0 | 1.0 | 10.0 | 10.0 | 1.0 | 1.0 |
| COMBINED WITHSTAND VOLTAGE V | 3.0 | 1.7 | 1.2 | 1.1 | 21.0 | 7.7 |
| COMBINED CAPACITANCE C | 0.33 | 0.20 | 0.83 | 0.31 | 0.48 | 0.43 |
| CHANGE IN COMBINED CAPACITANCE | | 1.7 | | 2.7 | | 1.1 |

FIG. 14A

CHANGE IN CAPACITANCE: 10

| | EXAMPLE 1 111 | | EXAMPLE 2 112 | | EXAMPLE 3 113 | |
|---|---|---|---|---|---|---|
| | max | min | max | min | max | min |
| VARIABLE CAPACITOR C1 | 1.0 | 0.1 | 10.0 | 1.0 | 1.0 | 0.1 |
| VARIABLE CAPACITOR C2 | 1.0 | 0.1 | 1.0 | 10.0 | 10.0 | 1.0 |
| VARIABLE CAPACITOR C3 | 1.0 | 0.1 | 1.0 | 10.0 | 10.0 | 1.0 |
| VARIABLE CAPACITOR C4 | 1.0 | 0.1 | 10.0 | 1.0 | 1.0 | 0.1 |
| COMBINED WITHSTAND VOLTAGE V | 2.0 | 2.0 | 2.0 | 2.0 | 2.0 | 2.0 |
| COMBINED CAPACITANCE C | 1.00 | 0.10 | 1.82 | 0.18 | 1.82 | 0.18 |
| CHANGE IN COMBINED CAPACITANCE | 10.0 | | 10.0 | | 10.0 | |

FIG. 14B

CHANGE IN CAPACITANCE: 10

| | EXAMPLE 1 121 | | EXAMPLE 2 122 | | EXAMPLE 3 123 | |
|---|---|---|---|---|---|---|
| | max | min | max | min | max | min |
| FIXED CAPACITOR C1 | 1.0 | 1.0 | 10.0 | 10.0 | 1.0 | 1.0 |
| VARIABLE CAPACITOR C2 | 1.0 | 0.1 | 1.0 | 10.0 | 10.0 | 1.0 |
| VARIABLE CAPACITOR C3 | 1.0 | 0.1 | 1.0 | 10.0 | 10.0 | 1.0 |
| FIXED CAPACITOR C4 | 1.0 | 1.0 | 10.0 | 10.0 | 1.0 | 1.0 |
| COMBINED WITHSTAND VOLTAGE V | 2.0 | 2.0 | 2.0 | 2.0 | 2.0 | 2.0 |
| COMBINED CAPACITANCE C | 1.00 | 0.18 | 1.82 | 0.20 | 1.82 | 1.00 |
| CHANGE IN COMBINED CAPACITANCE | 5.5 | | 9.2 | | 1.8 | |

POWER CONTROL APPARATUS AND ELECTRONIC APPLIANCE EQUIPPED WITH POWER CONTROL APPARATUS

CROSS REFERENCES TO RELATED APPLICATIONS

The present invention contains subject matter related to Japanese Patent Application JP 2007-315215 filed in the Japanese Patent Office on Dec. 5, 2007, the entire contents of which being incorporated herein by reference.

BACKGROUND OF THE INVENTION

1. Field of the Invention

The present invention relates to an electronic appliance and a power control apparatus favorably applied to controlling voltage or current in an electronic appliance.

2. Description of the Related Art

In recent years, electronic technology has come to be appreciated for its convenience and efficiency, and the spread of electronic appliances such as IT (information technology) and AV (audio visual) devices has accelerated on a global scale. At the same time, there has been increasing attention on the limited nature of the global environment and global resources, which has led to strong demand for low-energy technology in appliances.

For example, continuous improvements have been made in the efficiency of power supplies of electronic appliances, with switching power supplies, for example, achieving efficiencies of 90% and above. However, in reality, due to cost and noise considerations, many low-efficiency power supplies are still being used as before.

High-efficiency power supplies are also affected by voltage variations in the inputted power, fluctuations between components, and changes in the load current, and a large drop in efficiency is caused during low power operation, for example.

Power supplies are normally designed so as to be highly efficient at the rated load (power) of the appliance, but the operating power of an actual appliance will vary, and the efficiency of the power supply will also vary. For the example of a television set, the operating power greatly varies according to the audio output and brightness of the screen. Putting this another way, there will be an input voltage that is optimal for the size of the load current.

Since appliances are also affected by variations in the voltage of a commercial power supply, the power supply efficiency during actual operation will be lower than the appliance specification. This will be the same regardless of whether a switching regulator or a series regulator is used to supply power.

For example, although a no-load loss occurs for a typical transformer even when there is no load, resulting in minimum efficiency in the no-load state, as the load current increases, the power supply efficiency will also increase. However, since load loss is the square of the load current, once the current exceeds a certain range, the load loss will become a principal cause of the overall loss, resulting in a fall in efficiency. This relationship is shown in FIG. 1.

As one example of an actual transformerless power supply, as shown in FIG. 2, one terminal of a 100V AC commercial power supply 141 is connected via a capacitor 142 to one input terminal of a rectifier circuit 143 composed of a diode bridge, the other terminal of the commercial power supply 141 is connected to the other input terminal of the rectifier circuit 143, and a Zener diode 145 for keeping the voltage constant and a smoothing capacitor 146 are connected in parallel between the output terminals 144a and 144b of the rectifier circuit 143.

Accordingly, as shown in FIG. 2, in a transformerless power supply, by directly rectifying the commercial power supply 141 and passing the output through the Zener diode 145 that constructs a regulator, a stable DC voltage is obtained across the output terminals 144a and 144b.

In this construction, the load of the Zener diode 145 that constructs the regulator is reduced by lowering the voltage in advance using the capacitor 142.

Capacitors are often used in low-power applications. This is because that when the voltage is dropped due to a capacitor, the current shifts out of phase with the voltage, thereby preventing a power loss from occurring. As one example, such construction is used for a standby power supply or the like. However, since the rectified output of such circuits will vary due to load variations and the like, circuits are normally constructed in accordance with the maximum load and a stabilized voltage is produced by causing a power loss at the regulator when the load is light.

Also, since the voltage drop across both ends of a capacitor greatly changes due to variations in frequency and load current, capacitors may not be used in appliances where the load current is large and load variations are large. Accordingly, at present the use of capacitors is limited to extremely low power applications of around several tens of mW, such as standby power.

Also, with the transformerless power supply shown in FIG. 2, during operation using a relay or the like where power consumption is high, by connecting the capacitor 142 in parallel with another predetermined capacitor, it is possible to increase the supplied power, but it becomes necessary to switch between a plurality of capacitors to cover a wide load range. Although switching between a plurality of capacitors using a relay or the like is theoretically possible, aside from space and cost considerations, there are also the problems of slow response, the generation of noise during switching, the inability to continuously change the capacity, and reduced durability, which make such construction impractical. Accordingly, a device where the capacitance can be continuously changed in accordance with variations in the load is necessary.

For high-frequency circuit applications, varicaps and the like that utilize the capacitance between the terminals of a diode are available as capacitors where the capacitance can be electrically controlled. However, due to the capacitance, withstand voltage and the like, varicaps may not be used for power control.

A number of variable capacitors that use a MEMS (Micro Electro Mechanical System) have also been proposed in recent years, but such devices have a premise of using a high-frequency signal.

The capacitance of a capacitor is normally determined by the dielectric constant, the area of the electrodes, and the distance between the electrodes. Accordingly, it is sufficient to control at least one of them. In reality, MEMS proposes a technique that changes the distance between electrodes and/or area of facing electrodes by moving the electrodes.

As another example, Japanese Unexamined Patent Application Publication No. S62-259417 discloses a technology where the capacitance is changed by 70% by applying 50V to a ceramic capacitor to change the dielectric constant. Here, changing the cutoff frequency of a filter circuit or the oscillating frequency of a time-constant oscillator circuit is described as a proposed application.

SUMMARY OF THE INVENTION

As described above, power loss in electronic appliances and electronic circuits not only increases power consumption, causing users to pay extra for their electricity bill, but also wastes global resources and leads to increased global warming. It is therefore preferable to minimize power loss.

A series regulator method that uses a power supply transformer has a simple circuit construction and generates little noise. Such method drops the voltage to the required voltage using the power supply transformer that is connected to a commercial power supply and then rectifies the output using diodes and smoothes the output using a large-capacity capacitor. Since the rectified power is unstable, a regulator that controls the voltage drop across the terminals of the transistor is used to stabilize the voltage. The drop in voltage in this case is a DC voltage drop that is fundamentally all converted to heat, which results in a large loss in power. The drop in voltage that is required is greatly affected by fluctuations in the characteristics of components aside from the power supply transformer, the size of the load current, and the like, and if a margin is set for the voltage drop so as to stabilize the operation of the electronic appliance, the power loss in the normal state will be extremely large. In bad cases, efficiency can fall to around 30%.

In the switching regulator method, the voltage is stabilized by on/off control by a semiconductor element, resulting in little power loss and high efficiency. However, the efficiency will change depending on the input and load conditions, with efficiency deteriorating under light load conditions and the like. Accordingly there is demand to cover a wider range of inputs and load variations.

Also, in power applications, the variable capacitor disclosed in Japanese Unexamined Patent Application Publication No. S62-259417 has a small capacitance and needs a high control voltage, which makes it impractical.

In power control of an electronic appliance, unlike frequency control, the capacitance values of individual elements do not need to be precise. Even when the frequency band is low at around 300 KHz, there is a wide range of applicability, and error detection can be carried out using voltage or current, which makes feedback control easy.

Although variable capacitors used for power control in an electronic appliance have been described above, there is no device that can be used at present.

After carrying out thorough research, the present inventors found that a variable capacitor can be obtained by a combination of existing components, that can be controlled by a DC voltage, and that has the required capacitance and withstand voltage, without having to use a four-terminal device with added DC field electrodes like that shown in Japanese Unexamined Patent Application Publication No. S62-259417.

However, if the capacitance of a capacitor is raised to increase the range of power that can be handled, there have been the problems of an increase in cost and an increase in size. Further, regarding performance, there are demands for a wider variable range of capacitance, fast response, and a low driving voltage.

In particular, unless a power supply apparatus is incorporated into a single component, the apparatus will be unnecessarily large and therefore affect other parts of the design, and will also have a higher cost. Here, if the number of mounted components increases, the space in the height direction will increase in keeping with the number of mounted components.

The present invention was conceived in view of the problems described above and provides a power control apparatus capable of achieving AC power control with little power loss and low noise with a miniaturized and low-cost construction that has fewer mounted components and takes up less space.

Further, it is desirable to provide a high withstand voltage/low drive voltage circuit construction in a power control apparatus, that has increased capacitance and an increased variable range of capacitance while suppressing increases in size, that has improved response, and that is capable of being laminated upon itself.

According to an embodiment of the present invention, a power control apparatus includes: an input terminal and an output terminal for an AC signal; a DC removing capacitor connected between the input terminal and the output terminal; and a variable capacitor that is connected between the input terminal and the output terminal and whose capacitance can be changed by a control signal, wherein one of a current and a voltage of the AC signal is controlled by changing the capacitance of the variable capacitor using the control signal.

In particular, dielectrics that form a serially connected row of capacitors composed of the DC removing capacitor and the variable capacitor are configured so as to be integrally laminated, and the control signal is applied across a dielectric that forms the variable capacitor and the AC signal is applied across the dielectrics that form the row of capacitors.

In the power control apparatus according to an embodiment of the present invention, a capacitance of the DC removing capacitor and the variable capacitor may be adjusted by integrally laminating a plurality of the rows of capacitors, and when the plurality of the rows of capacitors are integrally laminated, laminating is carried out so that control signal terminals of the variable capacitors in a first row of capacitors and a second row of capacitors that are adjacent at a laminating surface are set at a same potential.

A thickness between the dielectrics that form the row of capacitors and a distance between electrodes of the dielectrics may be changed to change a combined capacitance, a withstand voltage, and a variable range of the combined capacitance of the DC removing capacitor and the variable capacitor.

Here, the combined capacitance, the withstand voltage, and the variable range of the combined capacitance of the DC removing capacitor and the variable capacitor may be changed by respectively connecting at least one other DC removing capacitor and at least one other variable capacitor to the DC removing capacitor and the variable capacitor in parallel.

According to an embodiment of the present invention, since a construction is used where dielectrics that form a row of capacitors, where a DC removing capacitor and a variable capacitor are serially connected, are integrally laminated, an effect is obtained that it is possible to reduce the size and the cost of a power supply apparatus.

Thereby, an effect is obtained that it is possible to reduced the number of mounted components of a power supply apparatus and to reduce the space in the height direction.

Further, an effect is obtained that it is also possible to control AC power with little power loss and low noise.

BRIEF DESCRIPTION OF THE DRAWINGS

FIG. 3A is a multilayer diagram and FIG. 3B is a circuit diagram.

FIG. 4A is a multilayer diagram and FIG. 4B is a circuit diagram.

FIGS. 5A and 5B are diagrams useful in explaining an example construction of a two-element (i.e., fixed capacitors ("2 C")/variable capacitor ("1 VC")) basic unit expanded example 2, where FIG. 5A is a multilayer diagram and FIG. 5B is a circuit diagram.

FIGS. 6A and 6B are tables useful in explaining example designs of a two-element (i.e., fixed capacitor (C)/variable capacitor (VC)) construction, where FIG. 6A shows the case where the change in capacitance of variable capacitance elements is ten times, and FIG. 6B shows the case where the change in capacitance of variable capacitance elements is three times.

FIGS. 7A and 7B are diagrams useful in explaining an example construction of a three-element (i.e., fixed capacitor ("1 C")/variable capacitor ("1 VC")/fixed capacitor ("1 C")) basic unit of a power control apparatus according to another embodiment of the present invention, where FIG. 7A is a multilayer diagram and FIG. 7B is a circuit diagram.

FIGS. 8A and 8B are diagrams useful in explaining one example construction of a three-element (i.e., fixed capacitor ("1 C")/variable capacitors ("3 VC")/fixed capacitor ("1 C")) basic unit expanded example 1, where FIG. 8A is a multilayer diagram and FIG. 8B is a circuit diagram.

FIG. 9A is a multilayer diagram and FIG. 9B is a circuit diagram.

FIGS. 10A and 10B are tables useful in explaining example designs of a three-element (i.e., fixed capacitor ("C")/variable capacitor ("VC")/fixed capacitor ("C")) construction, where FIG. 10A shows the case where the change in capacitance of variable capacitance elements is ten times, and FIG. 10B shows the case where the change in capacitance of variable capacitance elements is three times.

FIG. 11A is a multilayer diagram and FIG. 11B is a circuit diagram.

FIG. 13A shows a four-element (i.e., fixed capacitor ("1 C")/variable capacitor ("1 VC")/variable capacitor ("1 VC")/fixed capacitor ("1 C")) construction and FIG. 13B shows a four-element (i.e., variable capacitor ("1 VC")/fixed capacitor ("1 C")/fixed capacitor ("1 C")/variable capacitor ("1 C")) construction.

FIGS. 14A and 14B are tables useful in explaining example designs of a four-element construction, where FIG. 14A shows the case where the change in capacitance of variable capacitance elements of a four element (variable capacitor ("1 VC")/variable capacitor ("1 VC")/variable capacitor ("1 VC")/variable capacitor ("1 VC")) construction is ten times and FIG. 14B shows the case where the change in capacitance of variable capacitance elements of a four element (fixed capacitor ("1 C")/variable capacitor ("1 VC")/variable capacitor ("1 VC")/fixed capacitor ("1 C")) construction is ten times.

DESCRIPTION OF THE PREFERRED EMBODIMENTS

Preferred embodiments of the present invention will now be described with reference to FIGS. 3A, 3B to 14A, 14B.

The detailed circuit construction and multilayer state of a power control apparatus according to an embodiment of the present invention will now be described so as to cover every construction of a variable capacitance device with a four-terminal construction.

In particular, this variable capacitance device is characterized by having a variable capacitor and a DC removing capacitor integrally laminated. As specific examples, this variable capacitance device can have a two-element construction, a three-element construction, or a four-element construction. In addition, with the two-element and the three-element constructions, the capacitance can be expanded. Both the variable capacitance and the fixed capacitance can be expanded by connecting further capacitors in parallel.

It is possible to produce a single component by integrally laminating a DC removing capacitor and a variable capacitor.

Also, the capacitance and withstand voltage of the DC removing capacitor can be freely designed.

Here, although it is conceivable to increase the thickness of the dielectric to increase the withstand voltage of the DC removing capacitor, this results in reduced capacitance. Therefore, to achieve the required capacitance, one or more capacitors is connected in parallel.

Also, if the DC removing capacitor has a large capacitance, it is possible to increase the variable range of the combined capacitance of the DC removing capacitor and the variable capacitor.

On the other hand, the capacitance and withstand voltage of the variable capacitor can also be freely designed.

Here, if the capacitance of the variable capacitor is increased, it is possible to raise the AC withstand voltage.

Accordingly, the embodiments described below provide various constructions where the combined capacitance and withstand voltage and the variable range of the combined capacitance of the variable capacitor and the DC removing capacitor can be changed.

Figure 1:
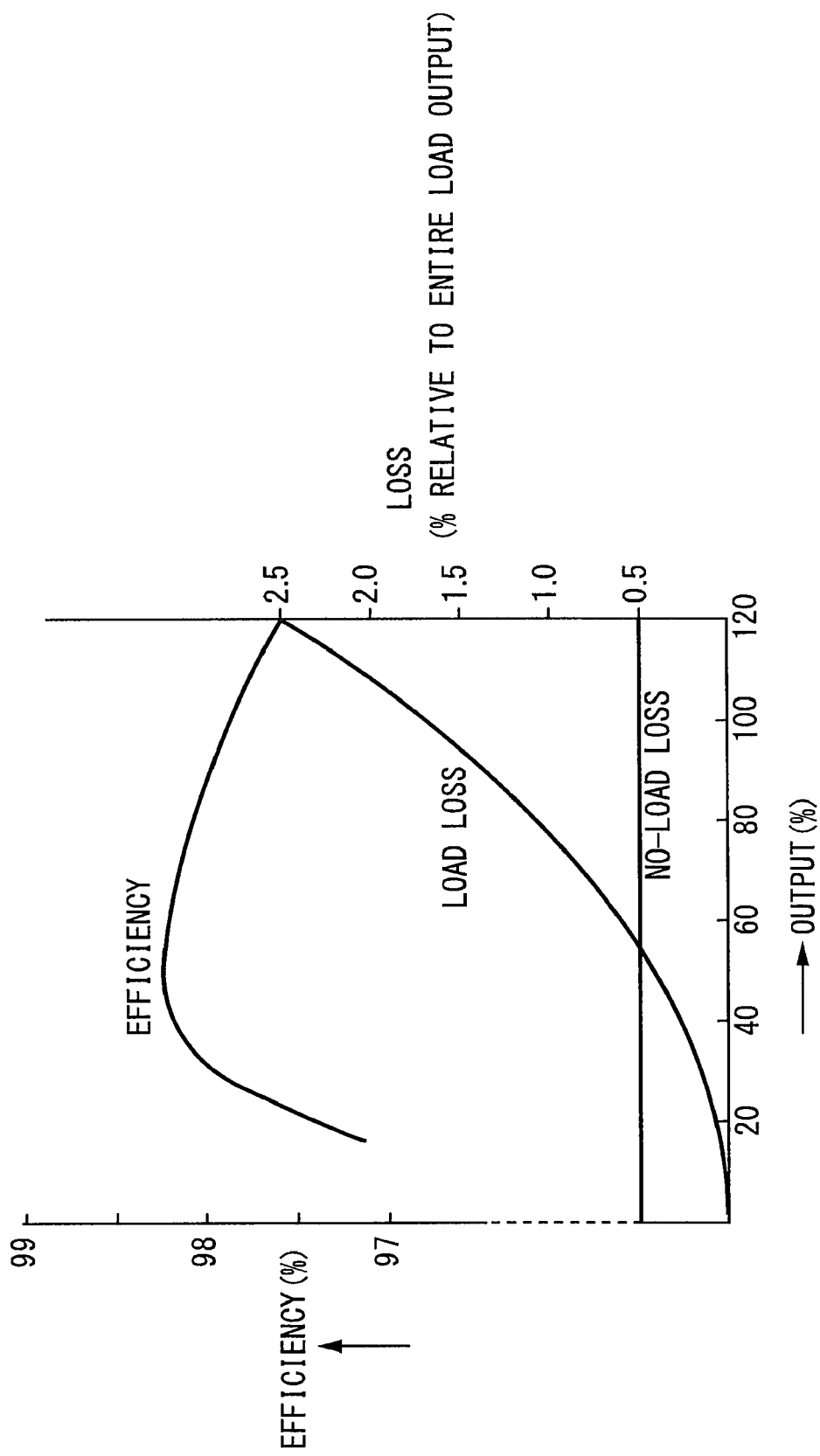
FIG. 1 is a graph showing the output vs. efficiency characteristics and output vs. loss characteristics of a typical transformer.
Figure 2:
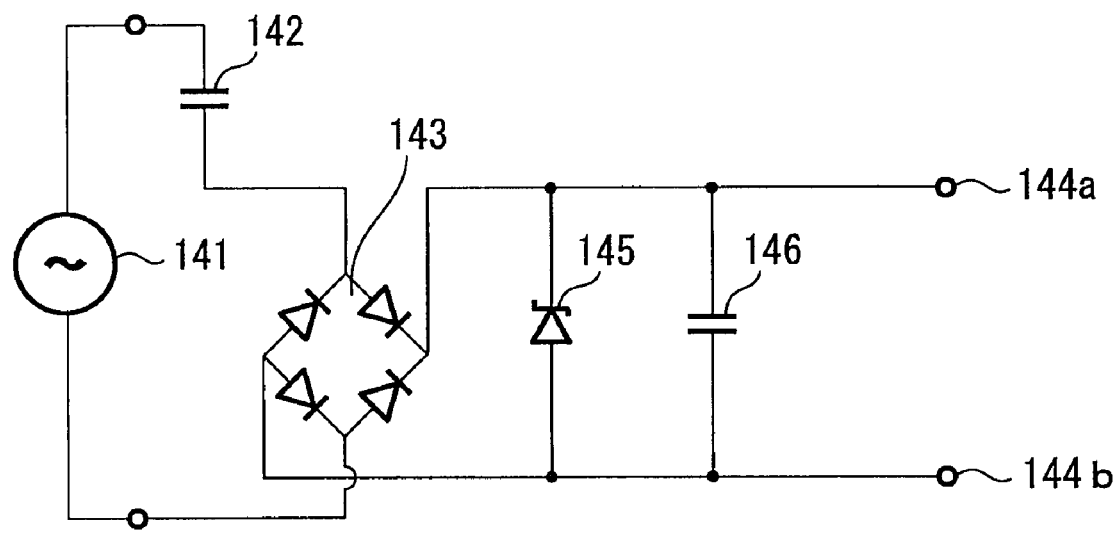
FIG. 2 is a diagram showing a typical transformerless power supply circuit.
Figure 3A:
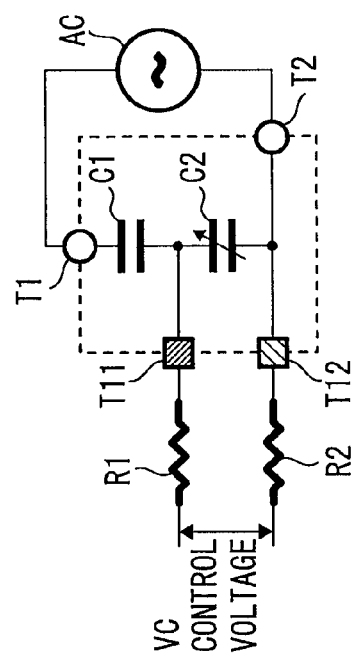
FIGS. 3A and 3B are diagrams useful in explaining one example construction of a two-element (i.e., fixed capacitor ("1 C")/variable capacitor ("1 VC")) basic unit of a power control apparatus according to an embodiment of the present invention, where
Figure 3B:
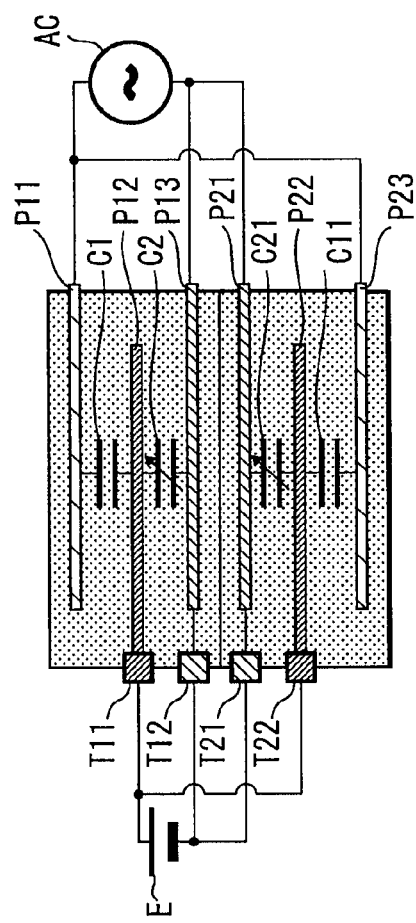

FIGS. 3A and 3B are diagrams useful in explaining one example construction of a two-element (i.e., fixed capacitor ("1 C")/variable capacitor ("1 VC")) basic unit of a power control apparatus according to an embodiment of the present invention, where FIG. 3A is a multilayer diagram and FIG. 3B is a circuit diagram.

In FIGS. 3A and 3B, a two-element construction composed of a fixed capacitor C1 ("1 C") and a variable capacitor C2 ("1 VC") is shown. Here, the expression "1 C" designates that the fixed capacitor C1 as a DC removing capacitor is composed of one capacitor. The expression "1 VC" designates that the variable capacitor C2 used to control voltage is composed of one capacitor. The expression "1 C/1 VC" designates that by combining "1 C" and "1 VC", a two-element construction is produced.

In the circuit diagram shown in FIG. 3B, a variable capacitance element of the variable capacitor C2 ("1 VC") and a fixed capacitance element of the fixed capacitor C1 ("1 C") are connected in series, and an AC power supply voltage AC is supplied to terminals T1, T2 at both ends of the serially connected elements.

A DC control voltage VC is supplied to terminals T11, T12 at both ends of the variable capacitor C2 ("1 VC"). Because an AC voltage difference is produced across the terminals T11, T12 of the variable capacitor C2, 10 KΩ resistors are connected as resistors R1, R2 to the control circuit of the control voltage VC, thereby reducing the amount of unnecessary current that flows to the control circuit.

In this two-element construction, the same terminal is used as the minus terminal T2 of the power supply voltage AC signal and the control terminal T12. By doing so, it is possible to reduce the number of components.

By integrally laminating the construction of the basic unit shown by the dashed line in the circuit diagram shown in FIG. 3B, the fixed capacitor C1 used as a DC removing capacitor and the variable capacitor C2 used to control voltage can be constructed so as to be incorporated in a single component.

In addition, by integrally laminating a plurality of the basic units shown by the dashed line in the circuit diagram shown in FIG. 3B in a multilayer structure, it is possible to adjust the capacitance of the fixed capacitor C1 used as the DC removing capacitor and the variable capacitor C2 used for controlling voltage in accordance with the number of laminated layers. When doing so, the fixed capacitors C1 and the variable capacitors C2 in the laminated basic units are respectively connected in parallel.

In the multilayer diagram shown in FIG. 3A, in the first (i.e., upper) basic unit, the fixed capacitor C1 used as a DC removing capacitor is constructed of a dielectric between an electrode P11 and an electrode P12. The variable capacitor C2 used for controlling voltage is constructed of a dielectric between the electrode P12 and an electrode P13.

In a second basic unit that is laminated on (i.e., below in FIG. 3A) the first basic unit, a variable capacitor C21 used to control voltage is constructed of a dielectric between an electrode P21 and an electrode P22. A fixed capacitor C11 used as a DC removing capacitor is constructed of a dielectric between the electrode P22 and an electrode P23.

Here, the serially connected row composed of the fixed capacitor C1 and the variable capacitor C2 of the first basic unit and the serially connected row composed of the fixed capacitor C11 and the variable capacitor C21 of the second basic unit are connected in parallel.

The variable capacitor C2 of the first basic unit and the variable capacitor C21 of the second basic unit are also connected in parallel.

In addition, the AC power supply voltage AC is supplied to the electrode P11 and the electrode P13 at both ends of the serially connected row composed of the fixed capacitor C1 and the variable capacitor C2 of the first basic unit. Similarly, the AC power supply voltage AC is supplied to the electrode P23 and the electrode P21 at both ends of the serially connected row composed of the fixed capacitor C11 and the variable capacitor C21 of the second basic unit.

The DC control voltage E is supplied to the terminals T11, T12 of the electrode P12 and the electrode P13 across the variable capacitor C2 of the first basic unit.

The DC control voltage E is also supplied to terminals T21, T22 of the electrode P21 and the electrode P22 across the variable capacitor C21 of the second basic unit. The DC control voltage E is a voltage produced by subtracting the voltage drop due to the resistors R1, R2 from the control voltage VC.

Here, out of the first basic unit and the second basic unit that are integrally laminated, the variable capacitor C2 of the first basic unit and the adjacent variable capacitor C21 of the second basic unit are constructed so that the control terminal T12 of the variable capacitor C2 and the control terminal T21 of the adjacent variable capacitor C21 are at the same potential.

Here, this "same potential" is a potential of the minus side of both the AC power supply voltage AC and the DC control voltage E.

Accordingly, it is possible to arbitrarily increase the number of laminated basic units until the required capacitance is achieved and to adjust the capacitance according to the number of laminated basic units.

Thereby, it is possible to control the voltage or current of an AC signal by changing the capacitance of the variable capacitors using a control signal.

Figure 4B:
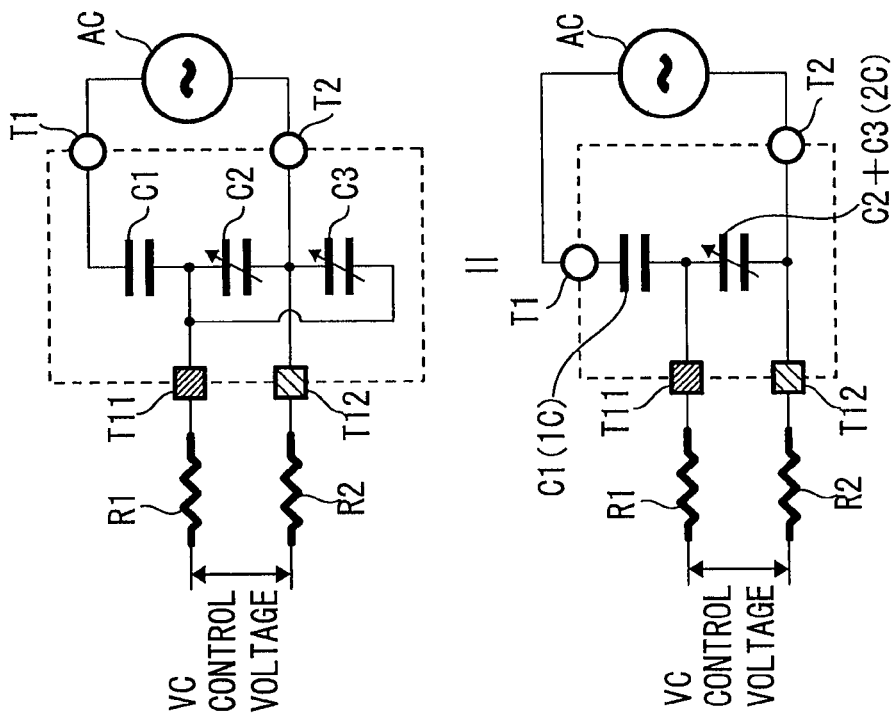
FIGS. 4A and 4B are diagrams useful in explaining one example construction of a two-element (i.e., fixed capacitor ("1 C")/variable capacitors ("2 VC")) basic unit expanded example 1, where
Figure 4A:
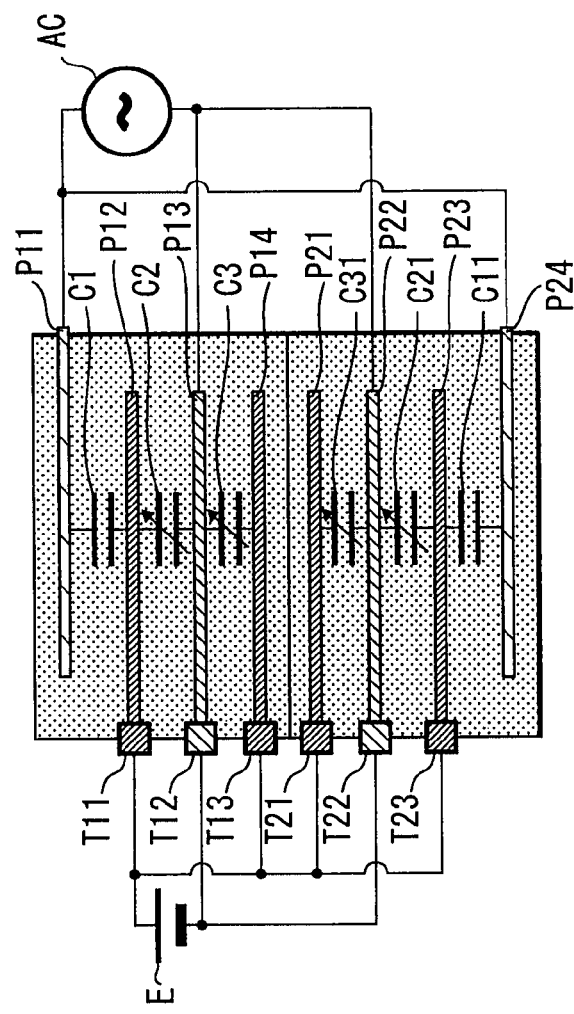

FIGS. 4A and 4B are diagrams useful in explaining one example construction of a two-element (i.e., fixed capacitor ("1 C")/variable capacitors ("2 VC")) basic unit expanded example 1, where FIG. 4A is a multilayer diagram and FIG. 4B is a circuit diagram.

In FIGS. 4A and 4B, the two-element basic unit expanded example 1 is constructed of a fixed capacitor C1 ("1 C") and variable capacitors C2 and C3 ("2 VC"). Here, the expression "1 C" designates that the fixed capacitor C1 used as a DC removing capacitor is composed of one capacitor.

The expression "2 VC" designates a construction where two capacitors, i.e., the variable capacitor C2 ("1 VC") and the variable capacitor C3 ("1 VC") for controlling the voltage, are connected in parallel ("2 VC"). The expression "1 C/2 VC" designates that the construction has two elements composed of the fixed capacitor C1 ("1 C") and the variable capacitors C2+C3 ("2 VC") and that the construction has been expanded compared to the construction shown in FIG. 3B by connecting variable capacitors in parallel.

In the circuit diagram in FIG. 4B, a variable capacitance element of the variable capacitor C2 ("1 VC") is connected in series with a fixed capacitance element of the fixed capacitor C1 ("1 C"), and an AC power supply voltage AC is supplied to terminals T1, T2 at both ends of the serially connected row of such capacitors.

Here, the variable capacitance element of the variable capacitor C2 ("1 VC") is also connected in parallel to another variable capacitance element of the variable capacitor C3 ("1 VC"). Accordingly, this is the equivalent of the variable capacitors C2+C3 ("2 VC") that are connected in parallel being connected in series to the fixed capacitance element of the fixed capacitor C1 (1 C).

A DC control voltage VC is supplied to the terminals T11, T12 at both ends of the variable capacitors C2+C3 ("2 VC"). Because an AC voltage difference is produced across the terminals of the variable capacitors C2+C3, 10 KΩ resistors are connected as resistors R1, R2 to the control circuit of the control voltage VC, thereby reducing the amount of unnecessary current that flows to the control circuit.

Here, in this two-element construction that has been expanded by connecting two variable capacitors in parallel, the same terminal is used as a minus terminal T2 of the power supply voltage AC signal and the control terminal T12. By doing so, it is possible to reduce the number of components.

By integrally laminating the construction of the basic unit shown by the dashed line in the circuit diagram shown in FIG.

4B, the fixed capacitor C1 used as the DC removing capacitor and the variable capacitors C2+C3 used to control voltage can be constructed so as to be incorporated in a single component.

In addition, by integrally laminating a plurality of the basic units shown by the dashed line in the circuit diagram shown in FIG. 4B in a multilayer structure, it is possible to adjust the capacitance of the fixed capacitor C1 used as the DC removing capacitor and the variable capacitors C2+C3 used for controlling voltage in accordance with the number of laminated layers. When doing so, the fixed capacitors C1 and the variable capacitors C2+C3 in the laminated basic units are respectively connected in parallel.

By doing so, since the capacitance of the variable capacitors C2+C3 is 2 C, by connecting n elements in parallel, the capacitance of the variable capacitors C2+C3+ . . . Cn+1 is given as nC. In addition, the capacitance when m basic units with the variable capacitors C2+C3+ . . . Cn+1 are integrally laminated is given as nmC.

In the multilayer diagram shown in FIG. 4A, in the first (i.e., upper) basic unit, the fixed capacitor C1 used as a DC removing capacitor is constructed of a dielectric between an electrode P11 and an electrode P12. The variable capacitor C2 used for controlling the voltage is constructed of a dielectric between the electrode P12 and an electrode P13 and the variable capacitor C3 used for controlling voltage is constructed of a dielectric between the electrode P13 and an electrode P14.

In a second basic unit that is laminated on (i.e., below in FIG. 4A) the first basic unit, a variable capacitor C31 used to control voltage is constructed of a dielectric between an electrode P21 and an electrode P22. A variable capacitor C21 used for controlling voltage is constructed of a dielectric between the electrode P22 and an electrode P23. A fixed capacitor C11 used as a DC removing capacitor is constructed of a dielectric between the electrode P23 and an electrode P24.

Here, the serially connected row composed of the fixed capacitor C1 and the variable capacitor C2 of the first basic unit and the serially connected row composed of the fixed capacitor C11 and the variable capacitor C21 of the second basic unit are connected in parallel.

The variable capacitor C2 of the first basic unit and the variable capacitor C21 of the second basic unit are also connected in parallel. The variable capacitor C2 and the variable capacitor C3 of the first basic unit are also connected in parallel. Similarly, the variable capacitor C21 and the variable capacitor C31 of the second basic unit are also connected in parallel.

In addition, the AC power supply voltage AC is supplied to the electrode P11 and the electrode P13 at both ends of the serially connected row composed of the fixed capacitor C1 and the variable capacitor C2 of the first basic unit. Similarly, the AC power supply voltage AC is supplied to the electrode P24 and the electrode P22 at both ends of the serially connected row composed of the fixed capacitor C11 and the variable capacitor C21 of the second basic unit.

The DC control voltage E is supplied to the terminals T11, T12 of the electrode P12 and the electrode P13 across the variable capacitor C2 of the first basic unit. The DC control voltage E is also supplied to the terminals T13, T12 of the electrode P14 and the electrode P13 across the variable capacitor C3 of the first basic unit.

In the same way, the DC control voltage E is supplied to the terminals T23, T22 of the electrode P23 and the electrode P22 across the variable capacitor C21 of the second basic unit. The DC control voltage E is also supplied to the terminals T21, T22 of the electrode P21 and the electrode P22 across the variable capacitor C31 of the second basic unit. The DC control voltage E is a voltage produced by subtracting the voltage drop due to the resistors R1, R2 from the control voltage VC.

Here, out of the first basic unit and the second basic unit that are integrally laminated, the variable capacitor C3 of the first basic unit and the adjacent variable capacitor C31 of the second basic unit are constructed so that a control terminal T13 of the variable capacitor C3 and a control terminal T21 of the adjacent variable capacitor C31 are at the same potential.

Here, this "same potential" is a potential of the minus side of both the AC power supply voltage AC and the DC control voltage E.

Accordingly, by using a construction that is expanded by connecting variable capacitors of the basic units in parallel, it is possible to expand the variable range of combined capacitance by changing the combined capacitance and withstand voltage of the fixed capacitors and the variable capacitors.

In addition, it is possible to arbitrarily increase the number of laminated basic units until the required capacitance is achieved and to adjust the capacitance according to the number of laminated basic units.

Thereby, it is possible to control the voltage or current of an AC signal by changing the capacitance of the variable capacitors using a control signal.

FIGS. 5A and 5B are diagrams useful in explaining one example construction of a two-element (i.e., fixed capacitors ("2 C")/variable capacitor ("1 VC")) basic unit expanded example 2, where FIG. 5A is a multilayer diagram and FIG. 5B is a circuit diagram.

In FIGS. 5A and 5B, the two-element basic unit expanded example 2 constructed of fixed capacitors C1+C2 ("2 C") and a variable capacitor C3 ("1 VC") is shown. Here, the expression "2 C" designates that a construction where two capacitors, i.e., the fixed capacitors C1 ("1 C") and C2 ("1 C"), are connected in series is used as a DC removing capacitor.

The expression "1 VC" designates that the variable capacitor C3 (1 VC) used to control the voltage is constructed of one capacitor. The expression "2 C/1 VC" designates that the construction has two elements composed of the fixed capacitors C1+C2 ("2 C") and the variable capacitor C3 ("1 VC") and that the construction has been expanded compared to the example in FIG. 3B by connecting two fixed capacitors in parallel.

In the circuit diagram in FIG. 5B, a variable capacitance element of the variable capacitor C3 ("1 VC") is connected in series with a fixed capacitance element of the fixed capacitor C2 ("1 C"), and an AC power supply voltage AC is supplied to terminals T1, T2 at both ends of the serially connected row of such capacitors.

Here, the fixed capacitance element of the fixed capacitor C2 ("1 C") is also connected in parallel to a fixed capacitance element of the fixed capacitor C1 ("1 C"). Accordingly, this is the equivalent of the fixed capacitors C1+C2 ("2 C") that are connected in parallel being connected in series to the variable capacitance element of the variable capacitor C3 ("1 VC").

A DC control voltage VC is supplied to terminals T11, T12 at both ends of the variable capacitor C3 ("1 VC"). Because an AC voltage difference is produced across the terminals of the variable capacitor C3, 10 KΩ resistors are connected as resistors R1, R2 to the control circuit of the control voltage VC, thereby reducing the amount of unnecessary current that flows to the control circuit.

Here, in this two-element construction that has been expanded by connecting two fixed capacitors in parallel, the same terminal is used as the minus terminal T2 of the power supply voltage AC signal and the control terminal T12. By doing so, it is possible to reduce the number of components.

By integrally laminating the construction of the basic unit shown by the dashed line in the circuit diagram shown in FIG. 5B, the fixed capacitors C1+C2 used as DC removing capacitors and the variable capacitor C3 used to control voltage can be constructed so as to be incorporated in a single component.

In addition, by integrally laminating a plurality of the basic units shown by the dashed line in the circuit diagram shown in FIG. 5B in a multilayer structure, it is possible to adjust the capacitance of the fixed capacitors C1+C2 used as DC removing capacitors and the variable capacitor C3 used for controlling voltage in accordance with the number of laminated layers. When doing so, the fixed capacitors C1+C2 and the variable capacitors C3 in the laminated basic units are respectively connected in parallel.

By doing so, since the capacitance of the fixed capacitors C2+C3 is 2C, by connecting n elements in parallel, the capacitance of the fixed capacitors C2+C3+ . . . Cn is given as nC. In addition, the capacitance when m basic units with the fixed capacitors C2+C3+ . . . Cn are integrally laminated is given as nmC.

In the multilayer diagram shown in FIG. 5A, in the first (i.e., upper) basic unit, the fixed capacitor C1 used as a DC removing capacitor is constructed of a dielectric between an electrode P11 and an electrode P12. The fixed capacitor C2 that is a DC removing capacitor is constructed of a dielectric between the electrode P12 and an electrode P13 and the variable capacitor C3 used for controlling voltage is constructed of a dielectric between the electrode P13 and an electrode P14.

In a second basic unit that is laminated on (i.e., below in FIG. 5A) the first basic unit, a variable capacitor C31 used to control voltage is constructed of a dielectric between an electrode P21 and an electrode P22. A fixed capacitor C21 that is a DC removing capacitor is constructed of a dielectric between the electrode P22 and an electrode P23 and a fixed capacitor C11 used as a DC removing capacitor is constructed of a dielectric between the electrode P23 and an electrode P24.

Here, the serially connected row composed of the fixed capacitor C2 and the variable capacitor C3 of the first basic unit and the serially connected row composed of the fixed capacitor C21 and the variable capacitor C31 of the second basic unit are connected in parallel.

The variable capacitor C3 of the first basic unit and the variable capacitor C31 of the second basic unit are also connected in parallel. The fixed capacitor C1 and the fixed capacitor C2 of the first basic unit are connected in parallel. The fixed capacitor C11 and the fixed capacitor C21 of the second basic unit are also connected in parallel.

In addition, the AC power supply voltage AC is supplied to the electrode P12 and the electrode P14 at both ends of the serially connected row composed of the fixed capacitor C2 and the variable capacitor C3 of the first basic unit. Similarly, the AC power supply voltage AC is supplied to the electrode P23 and the electrode P21 at both ends of the serially connected row composed of the fixed capacitor C21 and the variable capacitor C31 of the second basic unit.

The DC control voltage E is supplied to the terminals T11, T12 of the electrode P13 and the electrode P14 across the variable capacitor C3 of the first basic unit. The terminals T13, T11 of the electrode P11 and the electrode P13 across the fixed capacitors C1 and C2 of the first basic unit are both set at the same potential on the plus side of the DC control voltage E.

In the same way, the DC control voltage E is supplied to the terminals T22, T21 of the electrode P22 and the electrode P21 across the variable capacitor C31 of the second basic unit. The terminals T23, T22 of the electrode P24 and the electrode P22 across the fixed capacitors C11 and C21 of the second basic unit are both set at the same potential on the plus side of the DC control voltage E. The DC control voltage E is a voltage produced by subtracting the voltage drop due to the resistors R1, R2 from the control voltage VC.

Here, out of the first basic unit and the second basic unit that are integrally laminated, the variable capacitor C3 of the first basic unit and the adjacent variable capacitor C31 of the second basic unit are constructed so that a control terminal T12 of the variable capacitor C3 and a control terminal T21 of the adjacent variable capacitor C31 are at the same potential.

Here, this "same potential" is a potential of the minus side of both the AC power supply voltage AC and the DC control voltage E.

Accordingly, by using a construction that is expanded by connecting variable capacitors of the basic units in parallel, it is possible to expand the variable range of combined capacitance by changing the combined capacitance and withstand voltage of the fixed capacitor and the variable capacitors.

In addition, it is possible to arbitrarily increase the number of laminated basic units until the required capacitance is achieved and to adjust the capacitance according to the number of laminated units.

Thereby, it is possible to control the voltage or current of an AC signal by changing the capacitance of the variable capacitors using a control signal.

FIGS. 6A and 6B are tables useful in explaining example designs of a two-element (i.e., a capacitor (C)/variable capacitor (VC)) construction. FIG. 6A shows the case where the change in capacitance of the variable capacitance elements is ten times, and FIG. 6B shows the case where the change in capacitance of the variable capacitance elements is three times.

FIGS. 6A and 6B show example designs where the combined withstand voltage, combined capacitance, and change in combined capacitance when the capacitances of the elements (i.e., the capacitance of the variable capacitance element) are changed can be changed by expanding the two-element basic unit shown in FIG. 3B as shown in FIG. 4B or FIG. 5B and laminated in a multilayer structure.

FIG. 6A is useful in explaining designs where the change in capacitance of the variable capacitance elements is ten times.

In Example 1 shown in column 31, the values given below are produced when the capacitance of the fixed capacitor (C1) 34 is fixed at 1.0 [µF] and the capacitance of the variable capacitor (C2) 35 changes in a range of 0.1 to 1.0 [µF].

That is, when the capacitance of the variable capacitor (C2) 35 is the maximum value of 1.0 [µF], the combined withstand voltage (V) 36 is 2.0[V] and the combined capacitance (C) 37 is 0.50 [µF].

On the other hand, when the capacitance of the variable capacitor (C2) 35 is the minimum value of 0.1 [µF], the combined withstand voltage (V) is 1.1[V] and the combined capacitance (C) 37 is 0.09 [µF], resulting in a change in combined capacitance 38 of 5.5 times.

In Example 2 shown in column 32, the values given below are produced when the capacitance of the fixed capacitor (C1) 34 is fixed at 10.0 [µF] and the capacitance of the variable capacitor (C2) 35 changes in a range of 0.10 to 1.0 [µF].

That is, when the capacitance of the variable capacitor (C2) 35 is the maximum value of 1.0 [µF], the combined withstand voltage (V) is 1.1[V] and the combined capacitance (C) 37 is 0.91 [µF].

On the other hand, when the capacitance of the variable capacitor (C2) 35 is the minimum value of 0.1 [µF], the combined withstand voltage (V) 36 is 1.1[V] and the combined capacitance (C) 37 is 0.10 [μF], resulting in a change in combined capacitance 38 of 9.2 times.

In Example 3 shown in column 33, the values given below are produced when the capacitance of the fixed capacitor (C1) 34 is fixed at 1.0 [μF] and the capacitance of the variable capacitor (C2) 35 changes in a range of 1.0 to 10.0 [μF].

That is, when the capacitance of the variable capacitor (C2) 35 is the maximum value of 10.0 [μF], the combined withstand voltage (V) 36 is 11.0[V] and the combined capacitance (C) 37 is 0.91 [μF], On the other hand, when the capacitance of the variable capacitor (C2) 35 is the minimum value of 0.1 [μF], the combined withstand voltage (V) 36 is 2.0[V] and the combined capacitance (C) 37 is 0.50 [μF], resulting in a change in combined capacitance 38 of 1.8 times.

Here, in Example 1 shown in column 31, the combined withstand voltage (V) 36 changes to around one half, the combined capacitance (C) 37 changes to around one fifth, and the change in combined capacitance 38 is 5.5 times.

In Example 2 shown in column 32, the combined withstand voltage (V) 36 does not significantly change, the combined capacitance (C) 37 changes to around one tenth, and the change in combined capacitance 38 is 9.2 times.

In Example 3 shown in column 33, the combined withstand voltage (V) 36 changes to around one fifth, the combined capacitance (C) 37 changes to around one half, and the change in combined capacitance 38 is 1.8 times.

In this way, when the change in capacitance of the variable capacitance elements is ten times, in Example 1 shown in column 31, it is possible to reduce the combined withstand voltage (V) 36 to around one half, to reduce the combined capacitance (C) 37 to around one fifth, and to achieve a large change in combined capacitance 38 of 5.5 times.

In Example 2 shown in column 32, it is possible to make the largest reduction in the combined capacitance (C) 37 to around one tenth and to also achieve the largest change in combined capacitance 38 of 9.2 times.

In Example 3 shown in column 33, it is possible to reduce the combined withstand voltage (V) 36 to around one fifth, to reduce the combined capacitance (C) 37 to around one half, and to achieve a change in combined capacitance 38 of 1.8 times.

FIG. 6B is useful in explaining designs where the change in capacitance of the variable capacitance elements is three times.

In Example 1 shown in column 41, the values given below are produced when the capacitance of the fixed capacitor (C1) 44 is fixed at 1.0 [μF] and the capacitance of the variable capacitor (C2) 45 changes in a range of 0.3 to 1.0 [μF].

That is, when the capacitance of the variable capacitor (C2) 45 is the maximum value of 1.0 [μF], the combined withstand voltage (V) 46 is 2.0[V] and the combined capacitance (C) 47 is 0.50 [μF].

On the other hand, when the capacitance of the variable capacitor (C2) 45 is the minimum value of 0.3 [μF], the combined withstand voltage (V) 46 is 1.3[V] and the combined capacitance (C) 47 is 0.25 [μF], resulting in a change in combined capacitance 48 of 2.0 times.

In Example 2 shown in column 42, the values given below are produced when the capacitance of the fixed capacitor (C1) 44 is fixed at 10.0 [μF] and the capacitance of the variable capacitor (C2) 45 changes in a range of 0.33 to 1.0 [μF].

That is, when the capacitance of the variable capacitor (C2) 45 is the maximum value of 1.0 [μF], the combined withstand voltage (V) 46 is 1.1[V] and the combined capacitance (C) 47 is 0.91 [μF].

On the other hand, when the capacitance of the variable capacitor (C2) 45 is the minimum value of 0.33 [μF], the combined withstand voltage (V) 46 is 1.0[V] and the combined capacitance (C) 47 is 0.32 [μF], resulting in a change in combined capacitance 48 of 2.8 times.

In Example 3 shown in column 43, the values given below are produced when the capacitance of the fixed capacitor (C1) 44 is fixed at 1.0 [μF] and the capacitance of the variable capacitor (C2) 45 changes in a range of 3.3 to 10.0 [μF].

That is, when the capacitance of the variable capacitor (C2) 45 is the maximum value of 10.0 [μF], the combined withstand voltage (V) 46 is 11.0[V] and the combined capacitance (C) 47 is 0.91 [μF].

On the other hand, when the capacitance of the variable capacitor (C2) 45 is the minimum value of 3.3 [μF], the combined withstand voltage (V) 46 is 4.3 V] and the combined capacitance (C) 47 is 0.77 [μF], resulting in a change in combined capacitance 48 of 1.2 times.

Here, in Example 1 shown in column 41, the combined withstand voltage (V) 46 changes to around one half, the combined capacitance (C) 47 changes to around one half, and the change in combined capacitance 48 is 2.0 times.

In Example 2 shown in column 42, the combined withstand voltage (V) 46 does not significantly change, the combined capacitance (C) 47 changes to around one third, and the change in combined capacitance 48 is 2.8 times.

In Example 3 shown in column 43, the combined withstand voltage (V) 46 changes to around one half, the combined capacitance (C) 47 does not change, and the change in combined capacitance 48 is 1.2 times.

In this way, when the change in capacitance of the variable capacitance elements is three times, in Example 1 shown in column 41, it is possible to reduce the combined withstand voltage (V) 46 to around one half, to reduce the combined capacitance (C) 47 to around one half, and to achieve a change in combined capacitance 48 of 2.0 times.

In Example 2 shown in column 42, it is possible to make the largest reduction in the combined capacitance (C) 37 to around one third and to achieve a large change in combined capacitance 38 of 2.8 times.

In Example 3 shown in column 43, it is possible to reduce the combined withstand voltage (V) 46 to around one half, to reduce the combined capacitance (C) 47 to around one half, and to achieve a change in combined capacitance 48 of 1.2 times.

Note that the individual withstand voltages of all of the variable capacitors C are assumed to be "V".

FIGS. 7A and 7B are diagrams useful in explaining one example construction of a three-element (i.e., fixed capacitor (1 C)/variable capacitor (1 VC)/fixed capacitor (1 C)) basic unit of a power control apparatus according to another embodiment of the present invention, where FIG. 7A is a multilayer diagram and FIG. 7B is a circuit diagram.

In FIGS. 7A and 7B, a three-element construction composed of a fixed capacitor C1 ("1 C"), a variable capacitor C2 ("1 VC"), and a fixed capacitor C3 ("1 C") is shown. Here, the former expression "1 C" designates that the fixed capacitor C1 used as a DC removing capacitor is constructed of one capacitor, the expression "1 VC" designates that the variable capacitor C2 used to control the voltage is constructed of one capacitor, and the latter expression "1 C" designates that the fixed capacitor C3 used as a DC removing capacitor is constructed of one capacitor, and the expression "1 C/1 VC/1 C" designates that the construction has three elements composed of the fixed capacitor C1 ("1 C"), the variable capacitor C2 ("1 VC") and the fixed capacitor C3 ("1 C").

In the circuit diagram in FIG. 7B, respective ends of a variable capacitance element of the variable capacitor C2 ("1 VC") are connected in series with fixed capacitance elements of the fixed capacitor C1 ("1 C") and the fixed capacitor C3 ("1 C"), and an AC power supply voltage AC is supplied to terminals T1, T2 at both ends of such serially connected capacitors.

A DC control voltage VC is supplied to terminals T11, T12 at both ends of the variable capacitor C2 ("1 VC"). Because an AC voltage difference is produced across the terminals of the variable capacitor C2, the control circuit of the control voltage VC is connected to 10 KΩ resistors as the resistors R1, R2 to reduce the amount of unnecessary current that flows to the control circuit.

Here, with the three-element construction, the plus terminal T1 and the minus terminal T2 for the power supply voltage AC signal and the plus control terminal T11 and the minus control terminal T12 are constructed so as to be symmetrical. By doing so, it is possible to use the same construction even if the positions of the components are reversed between symmetrical positions.

By integrally laminating the basic unit shown by the dashed line in the circuit diagram shown in FIG. 7B, the fixed capacitor C1 used as a DC removing capacitor, the variable capacitor C2 used to control voltage, and the fixed capacitor C3 used as a DC removing capacitor can be constructed so as to be incorporated in a single component.

In addition, by integrally laminating a plurality of the basic units shown by the dashed line in the circuit diagram shown in FIG. 7B in a multilayer structure, it is possible to adjust the capacitance of the fixed capacitor C1 used as a DC removing capacitor, the variable capacitor C2 that is used for controlling voltage, and the fixed capacitor C3 used as a DC removing capacitor in accordance with the number of laminated layers. When doing so, the fixed capacitors C1, the variable capacitors C2, and the fixed capacitors C3 used as DC removing capacitors in the laminated basic units are respectively connected in parallel.

In the multilayer diagram shown in FIG. 7A, in the first (i.e., upper) basic unit, the fixed capacitor C1 used as a DC removing capacitor is constructed of a dielectric between an electrode P11 and an electrode P12. The variable capacitor C2 used for controlling voltage is constructed of a dielectric between the electrode P12 and an electrode P13 and the fixed capacitor C3 that is a DC removing capacitor is constructed of a dielectric between the electrode P13 and an electrode P14.

In a second basic unit that is laminated on (i.e., below in FIG. 7A) the first basic unit, a fixed capacitor C31 that is a DC removing capacitor is constructed of a dielectric between an electrode P21 and an electrode P22. Similarly, a variable capacitor C21 used for controlling voltage is constructed of a dielectric between the electrode P22 and an electrode P23. The fixed capacitor C11 used as a DC removing capacitor is constructed of a dielectric between the electrode P23 and an electrode P24.

Here, the serially connected row composed of the fixed capacitor C1, the variable capacitor C2, and the fixed capacitor C3 of the first basic unit and the serially connected row composed of the fixed capacitor C11, the variable capacitor C21, and the fixed capacitor C31 of the second basic unit are connected in parallel.

The variable capacitor C2 of the first basic unit and the variable capacitor C21 of the second basic unit are also connected in parallel.

In addition, the AC power supply voltage AC is supplied to the electrode P11 and the electrode P14 at both ends of the serially connected row composed of the fixed capacitor C1, the variable capacitor C2, and the fixed capacitor C3 of the first basic unit. Similarly, the AC power supply voltage AC is supplied to the electrode P24 and the electrode P21 at both ends of the serially connected row composed of the fixed capacitor C11, the variable capacitor C21, and the fixed capacitor C31 of the second basic unit.

The DC control voltage E is supplied to the terminals T11, T12 of the electrode P12 and the electrode P13 across the variable capacitor C2 of the first basic unit.

The DC control voltage E is also supplied to the terminals T22, T21 of the electrode P23 and the electrode P22 across the variable capacitor C21 of the second basic unit. The AC control voltage E is a voltage produced by subtracting the voltage drop due to the resistors R1, R2 from the control voltage VC.

Here, out of the first basic unit and the second basic unit that are integrally laminated, the fixed capacitor C3 of the first basic unit and the adjacent fixed capacitor C31 of the second basic unit are constructed so that an electrode P12 that is connected to an AC terminal of the fixed capacitor C3 and an electrode P21 that is connected to an AC terminal of the adjacent fixed capacitor C31 are at the same potential.

Here, this "same potential" is a potential of the minus side of the AC power supply voltage AC.

Accordingly, it is possible to arbitrarily increase the number of laminated basic units until the required capacitance is achieved and to adjust the capacitance according to the number of laminated units.

By doing so, it is possible to control the voltage or current of an AC signal by changing the capacitance of the variable capacitors using a control signal.

FIGS. 8A and 8B are diagrams useful in explaining one example construction of a three-element (i.e., fixed capacitor ("1 C")/variable capacitors ("3 VC")/fixed capacitor ("1 C")) basic unit expanded example 1, where FIG. 8A is a multilayer diagram and FIG. 8B is a circuit diagram.

In FIGS. 8A and 8B, the three-element basic unit expanded example 1 constructed of a fixed capacitor C1 ("1 C"), three variable capacitors C2, C3, and C4 ("3 VC"), and a fixed capacitor C5 ("1 C") is shown. Here, the former expression "1 C" designates that the fixed capacitor C1 used as a DC removing capacitor is composed of one capacitor.

The expression "3 VC" designates a construction ("3 VC") where three capacitors, i.e., the variable capacitor C2, the variable capacitor C3, and the variable capacitor C4 for controlling the voltage are connected in parallel. Also, the latter expression "1 C" designates that the fixed capacitor C5 used as a DC removing capacitor is composed of one capacitor.

The expression "1 C/3 VC/1 C" designates that the construction is composed of three elements made up of the fixed capacitor C1 ("1 C"), the variable capacitors C2+C3+C4 ("3 VC"), and the fixed capacitor C5 ("1 C") and that the variable capacitors are connected in parallel to expand the construction.

In the circuit diagram in FIG. 8B, respective ends of a variable capacitance element of the variable capacitor C2 ("1 VC") are connected in series with fixed capacitance elements of the fixed capacitor C1 ("1 C") and the fixed capacitor C5 ("1 C"), and an AC power supply voltage AC is supplied to terminals T1, T2 at both ends of such serially connected capacitors.

Here, this variable capacitance element of the variable capacitor C2 ("1 VC") is also connected in parallel to other variable capacitance elements of the variable capacitor C3 ("1 VC") and the variable capacitor C4 ("1 VC"). Accordingly, this is the equivalent of the variable capacitors C2+C3+C4 ("3 VC") that are connected in parallel being connected in series to the fixed capacitance elements of the fixed capacitor C1 ("1 C") and the fixed capacitor C5 ("1 C").

A DC control voltage VC is supplied to terminals T11, T12 at both ends of the variable capacitors C2+C3+C4("3 VC") that are connected in parallel. Because an AC voltage difference is produced across the terminals of the variable capacitors C2+C3+C4, 10 KΩ resistors are connected as resistors R1, R2 to the control circuit of the control voltage VC, thereby reducing the amount of unnecessary current that flows to the control circuit.

Here, with this three-element construction that has been expanded by connecting variable capacitors in parallel, the plus terminal T1 and the minus terminal T2 for the power supply voltage AC signal and the plus control terminal T11 and the minus control terminal T12 are constructed so as to be symmetrical. By doing so, it is possible to use the same construction even if the positions of the components are reversed between symmetrical positions.

By integrally laminating the basic unit shown by a dashed line in the circuit diagram shown in FIG. 8B, the fixed capacitor C1 used as a DC removing capacitor, the variable capacitors C2+C3+C4 used to control voltage, and the fixed capacitor C5 used as a DC removing capacitor can be constructed so as to be incorporated in a single component.

In addition, by integrally laminating a plurality of the basic units shown by the dashed line in the circuit diagram shown in FIG. 8B in a multilayer structure, it is possible to adjust the capacitance of the fixed capacitor C1 used as a DC removing capacitor, the variable capacitors C2+C3+C4 used for controlling voltage, and the fixed capacitor C1 used as a DC removing capacitor in accordance with the number of laminated layers. When doing so, the fixed capacitors C1, the variable capacitors C2+C3+C4 and the other fixed capacitors C5 used as DC removing capacitors in the laminated basic units are connected in parallel.

By doing so, since the capacitance of the variable capacitors C2+C3+C4 is 3 C, by connecting n elements in parallel, the capacitance of the variable capacitors (C2+C3+C4)+ . . . + (Cn−1+Cn+Cn+1) is given as (n+1)C. In addition the capacitance when m basic units with the variable capacitors (C2+C3+C4)+ . . . +(Cn−1+Cn+Cn+1) are integrally laminated is given as (n+1)mC.

In the multilayer diagram shown in FIG. 8A, in the first (i.e., upper) basic unit, the fixed capacitor C1 used as a DC removing capacitor is constructed of a dielectric between an electrode P11 and an electrode P12. The variable capacitor C2 used for controlling voltage is constructed of a dielectric between the electrode P12 and an electrode P13 and the variable capacitor C3 used for controlling voltage is constructed of a dielectric between the electrode P13 and an electrode P14.

The variable capacitor C4 used for controlling voltage is constructed of a dielectric between the electrode P14 and an electrode P15 and the fixed capacitor C5 that is a DC removing capacitor is constructed of a dielectric between the electrode P15 and an electrode P16.

In a second basic unit that is laminated on (i.e., below in FIG. 8A) the first basic unit, a variable capacitor C51 used to control voltage is constructed of a dielectric between an electrode P21 and an electrode P22. A variable capacitor C41 used for controlling voltage is constructed of a dielectric between the electrode P22 and an electrode P23.

A variable capacitor C31 used to control voltage is constructed of a dielectric between the electrode P23 and an electrode P24. In the same way, a variable capacitor C21 used to control voltage is constructed of a dielectric between the electrode P24 and an electrode P25. Also, a fixed capacitor C11 used as a DC removing capacitor is constructed of a dielectric between the electrode P25 and an electrode P26.

Here, the serially connected row composed of the fixed capacitor C1 and the variable capacitor C2 of the first basic unit and the serially connected row composed of the fixed capacitor C11, the variable capacitor C21, and the fixed capacitor C51 of the second basic unit are connected in parallel.

The variable capacitor C2 of the first basic unit and the variable capacitor C21 of the second basic unit are also connected in parallel. In addition, the variable capacitor C2, the variable capacitor C3, and the variable capacitor C4 of the first basic unit are connected in parallel. Similarly, the variable capacitor C21, the variable capacitor C31, and the variable capacitor C41 of the second basic unit are connected in parallel.

In addition, the AC power supply voltage AC is supplied to the electrode P11 and the electrode P16 at both ends of the serially connected row composed of the fixed capacitor C1, the variable capacitor C2, and the fixed capacitor C5 of the first basic unit. Similarly, the AC power supply voltage AC is supplied to the electrode P26 and the electrode P21 at both ends of the serially connected row composed of the fixed capacitor C11, the variable capacitor C21, and the fixed capacitor C51 of the second basic unit.

The DC control voltage E is supplied to the terminals T12, T11 of the electrode P12 and the electrode P13 across the variable capacitor C2 of the first basic unit. Similarly, the DC control voltage E is supplied to the terminals T13, T12 of the electrode P14 and the electrode P13 across the variable capacitor C3 of the first basic unit. Also, the AC control voltage E is supplied to the terminals T14, T13 of the electrode P14 and the electrode P15 across the variable capacitor C4 of the first basic unit.

The DC control voltage E is supplied to the terminals T24, T23 of the electrode P25 and the electrode P24 across the variable capacitor C21 of the second basic unit. The DC control voltage E is supplied to the terminals T22, T23 of the electrode P23 and the electrode P24 across the variable capacitor C31 of the second basic unit.

In the same way, the DC control voltage E is supplied to the terminals T22, T21 of the electrode P23 and the electrode P22 across the variable capacitor C41 of the second basic unit. The DC control voltage E is a voltage produced by subtracting the voltage drop due to the resistors R1, R2 from the control voltage VC.

Here, out of the first basic unit and the second basic unit that are integrally laminated, the fixed capacitor C5 of the first basic unit and the adjacent fixed capacitor C51 of the second basic unit are constructed so that an electrode P16 that is connected to an AC terminal of the fixed capacitor C5 and an electrode P21 that is connected to an AC terminal of the adjacent fixed capacitor C51 are at the same potential.

Here, this "same potential" is a potential of the minus side of the AC power supply voltage AC.

Accordingly, by using a construction that is expanded by connecting variable capacitors of the basic unit in parallel, it is possible to expand the variable range of combined capacitance by changing the combined capacitance and withstand voltage of the fixed capacitors and the variable capacitors.

In addition, it is possible to arbitrarily increase the number of laminated basic units until the required capacitance is achieved and to adjust the capacitance according to the number of laminated basic units.

By doing so, it is possible to control the voltage or current of an AC signal by changing the capacitance of the variable capacitors using a control signal.

Figure 9B:
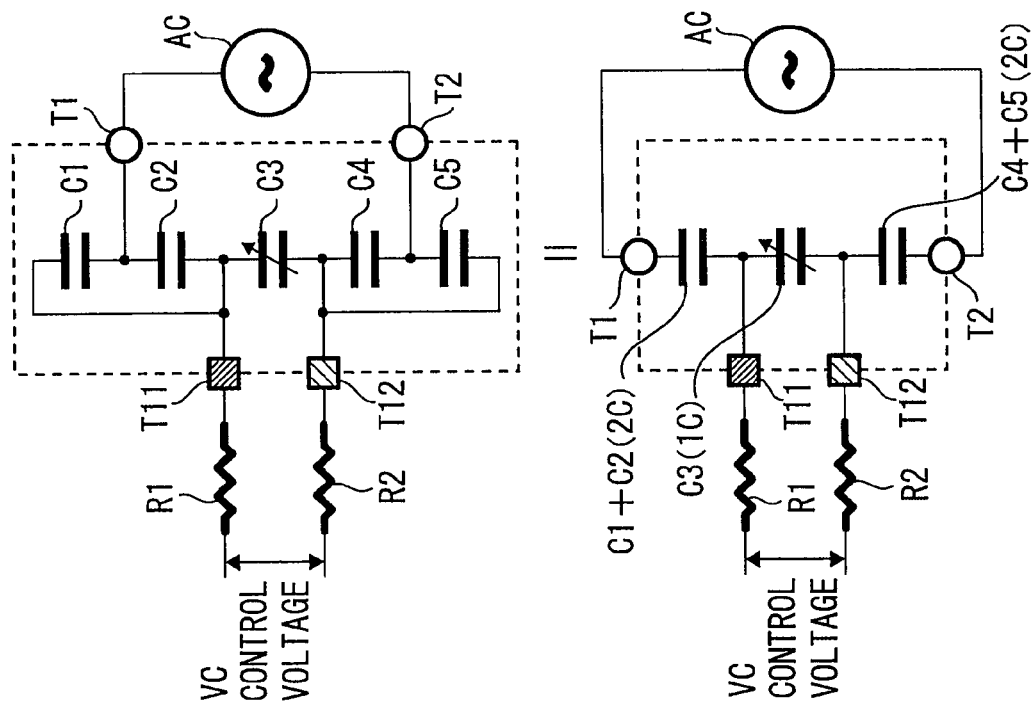
FIGS. 9A and 9B are diagrams useful in explaining one example construction of a three-element (i.e., fixed capacitors ("2 C")/variable capacitor ("1 VC")/fixed capacitors ("2 C")) basic expanded example 2, where
Figure 9A:
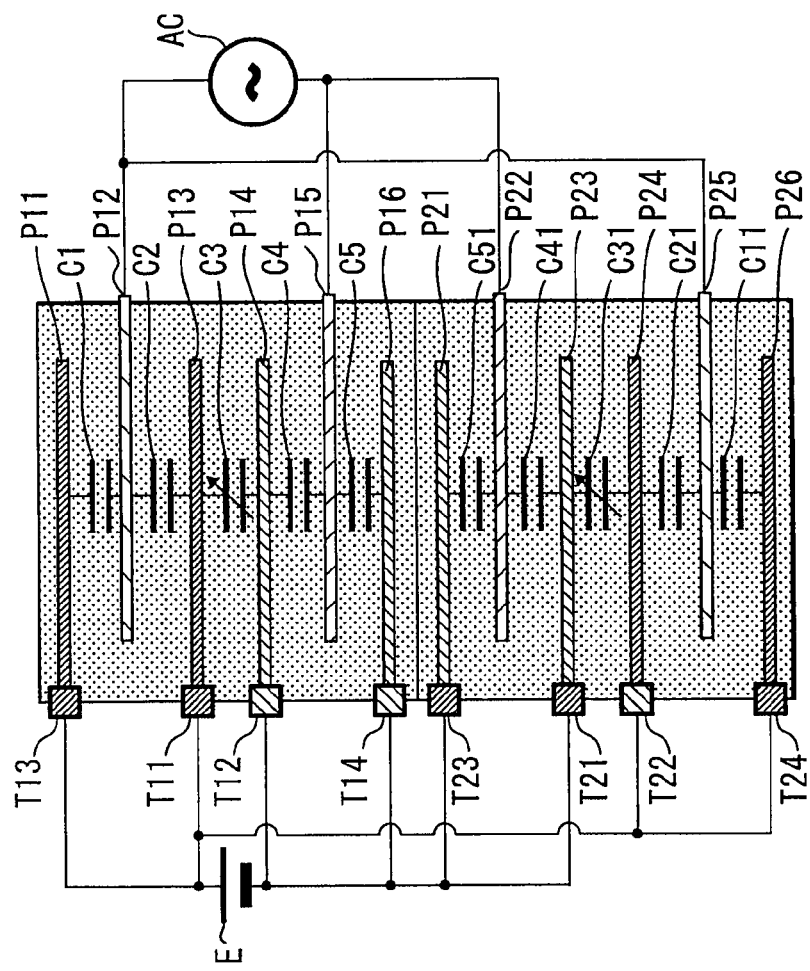

FIGS. 9A and 9B are diagrams useful in explaining one example construction of a three-element (i.e., fixed capacitors ("2 C")/variable capacitor ("1 VC")/fixed capacitors ("2 C")) basic unit expanded example 2, where FIG. 9A is a multilayer diagram and FIG. 9B is a circuit diagram.

In FIGS. 9A and 9B, the three-element basic unit expanded example 2 constructed of fixed capacitors C1+C2 ("2 C"), one variable capacitor C3 ("1 VC") and fixed capacitors C4+C5 ("2 C") is shown. Here, the former expression "2 C" designates a construction where two capacitors, i.e., the fixed capacitor C1 ("1 C") and the fixed capacitor C2 ("1 C") used as DC removing capacitors are connected in parallel.

Similarly, the expression "1 VC" designates that the variable capacitor C3 ("1 VC") used to control voltage is constructed of one capacitor. Also, the latter expression "2 C" designates a construction where two capacitors, i.e., the fixed capacitor C4 ("1 C") and the fixed capacitor C5 ("1 C") used as DC removing capacitors, are connected in parallel.

The expression "2 C/1 VC/2 C" designates that the construction is composed of three elements made up of the fixed capacitors C1+C2 ("2 C"), the variable capacitor C3 ("1 VC"), and the fixed capacitor C4+C5 ("2 C"), and that the fixed capacitors are connected in parallel to expand the construction.

In the circuit diagram in FIG. 9B, respective ends of a variable capacitance element of the variable capacitor C3 ("1 VC") are connected in series with a fixed capacitance element of the fixed capacitor C2 ("1 C") and another fixed capacitance element of the fixed capacitor C4 ("1 C"), and an AC power supply voltage AC is supplied to terminals T1, T2 at both ends of such elements connected in series.

Here, the fixed capacitance element of the fixed capacitor C2 ("1 C") is connected in parallel to the fixed capacitance element of the fixed capacitor C1 ("1 C"). In the same way, a fixed capacitance element of the fixed capacitor C5 ("1 C") is connected in parallel to the fixed capacitance element of the fixed capacitor C4 ("1 C").

Accordingly, this is the equivalent of the fixed capacitors C1+C2 ("2 C") that are connected in parallel and the fixed capacitors C4+C5 ("2 C") that are connected in parallel being connected in series to the variable capacitance element of the variable capacitor C3 ("1 VC").

A DC control voltage VC is supplied to terminals T11, T12 at both ends of the variable capacitor C3 ("1 VC"). Because an AC voltage difference is produced across the terminals of the variable capacitor C3, 10 KΩ resistors are connected as resistors R1, R2 to the control circuit of the control voltage VC, thereby reducing the amount of unnecessary current that flows to the control circuit.

Here, with this three-element construction that has been expanded by connecting fixed capacitors in parallel, the plus terminal T1 and the minus terminal T2 for the power supply voltage AC signal and the plus control terminal T11 and the minus control terminal T12 are constructed so as to be symmetrical. By doing so, it is possible to use the same construction even if the positions of the components are reversed between symmetrical positions.

By integrally laminating the basic unit shown by a dashed line in the circuit diagram shown in FIG. 9B, the fixed capacitors C1+C2 used as DC removing capacitors, the variable capacitor C3 used to control voltage, and the fixed capacitors C4+C5 used as DC removing capacitors can be constructed so as to be incorporated in a single component.

In addition, by integrally laminating a plurality of the basic units shown by the dashed line in the circuit diagram shown in FIG. 9B in a multilayer structure, it is possible to adjust the capacitance of the fixed capacitors C1+C2 used as DC removing capacitors, the variable capacitor C3 used to control voltage, and the capacitance of the fixed capacitors C4+C5 used as DC removing capacitors in accordance with the number of laminated layers. When doing so, the fixed capacitors C1+C2, the variable capacitors C3, and the fixed capacitors C4+C5 used as DC removing capacitors in the laminated basic units are respectively connected in parallel.

By doing so, since the capacitance of the fixed capacitors C1+C2 is 2 C and the capacitance of the fixed capacitors C4+C5 is 2 C, by connecting n elements in parallel, the capacitance of the fixed capacitors (C1+C2)+(C4+C5)+ ... + (Cn−3+Cn−2)+(Cn−1+Cn) is given as 2 nC. In addition, the capacitance when m basic units with the fixed capacitors (C1+C2)+(C4+C5)+ ... +(Cn−3+Cn−2)+(Cn−1+Cn) are integrally laminated is given as 2 nmC.

In the multilayer diagram shown in FIG. 9A, in the first (i.e., upper) basic unit, the fixed capacitor C1 used as a DC removing capacitor is constructed of a dielectric between an electrode P11 and an electrode P12. The fixed capacitor C2 that is a DC removing capacitor is constructed of a dielectric between the electrode P12 and an electrode P13 and the variable capacitor C3 used for controlling the voltage is constructed of a dielectric between the electrode P13 and an electrode P14.

The fixed capacitor C4 that is a DC removing capacitor is constructed of a dielectric between the electrode P14 and an electrode P15, and the fixed capacitor C5 that is a DC removing capacitor is constructed of a dielectric between the electrode P15 and an electrode P16.

In a second basic unit that is laminated on (i.e., below in FIG. 9A) the first basic unit, a fixed capacitor C51 that is a DC removing capacitor is constructed of a dielectric between an electrode P21 and an electrode P22. A fixed capacitor C41 that is a DC removing capacitor is constructed of a dielectric between the electrode P22 and an electrode P23 and a variable capacitor C31 used to control voltage is constructed of a dielectric between the electrode P23 and an electrode P24.

In the same way, the fixed capacitor C21 that is a DC removing capacitor is constructed of a dielectric between the electrode P24 and an electrode P25. Also, the fixed capacitor C11 used as a DC removing capacitor is constructed of a dielectric between the electrode P25 and an electrode P26.

Here, the serially connected row composed of the fixed capacitor C2, the variable capacitor C3, and the fixed capacitor C4 of the first basic unit and the serially connected row composed of the fixed capacitor C21, the variable capacitor C31, and the fixed capacitor C41 of the second basic unit are connected in parallel.

The variable capacitor C3 of the first basic unit and the variable capacitor C31 of the second basic unit are also connected in parallel. In addition, the fixed capacitor C1 and the fixed capacitor C2 of the first basic unit are connected in parallel. Similarly, the fixed capacitor C4 and the fixed capacitor C5 of the first basic unit are connected in parallel.

Similarly, the fixed capacitor C11 and the fixed capacitor C21 of the second basic unit are connected in parallel. Also, the fixed capacitor C41 and the fixed capacitor C51 of the second basic unit are connected in parallel.

In addition, the AC power supply voltage AC is supplied to the electrode P12 and the electrode P15 at both ends of the serially connected row composed of the fixed capacitor C2, the variable capacitor C3, and the fixed capacitor C4 of the first basic unit. Similarly, the AC power supply voltage AC is supplied to the electrode P25 and the electrode P22 at both ends of the serially connected row composed of the fixed capacitor C21, the variable capacitor C31, and the fixed capacitor C41 of the second basic unit.

In addition, the AC control voltage E is supplied to the terminals T11, T12 of the electrode P13 and the electrode P12 across the variable capacitor C3 of the first basic unit. Also, the terminals T13, T11 of the electrode P11 and the electrode P13 between the fixed capacitors C1 and C2 of the first basic unit both become the same potential as the plus side of the DC control voltage E.

In the same way, the terminals T12, T14 of the electrode P14 and the electrode P16 between the fixed capacitors C4 and C5 of the first basic unit both become the same potential as the minus side of the DC control voltage E.

The DC control voltage is supplied to the terminals T22, T21 of the electrode P24 and the electrode P23 between the variable capacitor C31 of the second basic unit. The terminals T24, T22 of the electrode P26 and the electrode P24 between the fixed capacitors C11 and C21 of the second basic unit both become the same potential as the plus side of the DC control voltage E.

In the same way, the terminals T21, T23 of the electrode P23 and the electrode P21 between the fixed capacitors C41 and C51 of the second basic unit both become the same potential as the minus side of the DC control voltage E. The DC control voltage E is a voltage produced by subtracting the voltage drop due to the resistors R1, R2 from the control voltage VC.

Here, out of the first basic unit and the second basic unit that are integrally laminated, the fixed capacitor C5 of the first basic unit and the adjacent fixed capacitor C51 of the second basic unit are constructed so that the AC terminal T14 of the fixed capacitor C5 and the AC terminal T23 of the adjacent fixed capacitor C51 are at the same potential.

Here, this "same potential" is a potential of the minus side of the AC power supply voltage AC.

Accordingly, by using a construction that is expanded by connecting fixed capacitors of the basic unit in parallel, it is possible to expand the variable range of combined capacitance by changing the combined capacitance and withstand voltage of the fixed capacitors and the variable capacitor.

In addition, it is possible to arbitrarily increase the number of laminated basic units until the required capacitance is achieved and to adjust the capacitance according to the number of laminated units.

By doing so, it is possible to control the voltage or current of an AC signal by changing the capacitance of the variable capacitors using a control signal.

FIGS. 10A and 10B are tables useful in explaining example designs of a three-element (i.e., fixed capacitor ("C")/variable capacitor ("VC")/fixed capacitor ("C")) construction. FIG. 10A shows the case where the change in capacitance of the variable capacitance elements is ten times, and FIG. 10B shows the case where the change in capacitance of the variable capacitance elements is three times.

FIGS. 10A and 10B show example designs where the combined withstand voltage, combined capacitance, and change in combined capacitance when the capacitances of the elements (i.e., the capacitances of the variable capacitance elements) are changed can be changed by expanding the three-element basic unit shown in FIG. 7B as shown in FIG. 8B or FIG. 9B and laminated in a multilayer structure FIG. 10A is useful in explaining designs where the change in capacitance of the variable capacitance elements is ten times.

In Example 1 shown in column 71, the values given below are produced when the capacitance of the fixed capacitor (C1) 74 and the fixed capacitor (C3) 76 is fixed at 1.0 [μF] and the capacitance of the variable capacitor (C2) 75 changes in a range of 0.1 to 1.0 [μF].

That is, when the capacitance of the variable capacitor (C2) 75 is the maximum value of 1.0 [μF], the combined withstand voltage (V) 77 is 3.0 [V] and the combined capacitance (C) 78 is 0.33 [μF].

On the other hand, when the capacitance of the variable capacitor (C2) 75 is the minimum value of 0.1 [μF], the combined withstand voltage (V) 77 is 1.2 [V] and the combined capacitance (C) 78 is 0.08 [μF], resulting in a change in combined capacitance 79 of 4.0 times.

In Example 2 shown in column 72, the values given below are produced when the capacitance of the fixed capacitor (C1) 74 and the fixed capacitor (C3) 76 is fixed at 10.0 [μF] and the capacitance of the variable capacitor (C2) 75 changes in a range of 0.1 to 1.0 [μF].

That is, when the capacitance of the variable capacitor (C2) 75 is the maximum value of 1.0 [μF], the combined withstand voltage (V) 77 is 1.2 [V] and the combined capacitance (C) 78 is 0.83 [μF].

On the other hand, when the capacitance of the variable capacitor (C2) 75 is the minimum value of 0.1 [μF], the combined withstand voltage (V) 77 is 1.0 [V] and the combined capacitance (C) 78 is 0.10 [μF], resulting in a change in combined capacitance 79 of 8.5 times.

In Example 3 shown in column 73, the values given below are produced when the capacitance of the fixed capacitor (C1) 74 and the fixed capacitor (C3) 76 is fixed at 1.0 [μF] and the capacitance of the variable capacitor (C2) 75 changes in a range of 1.0 to 10.0 [μF].

That is, when the capacitance of the variable capacitor (C2) 75 is the maximum value of 10.0 [μF], the combined withstand voltage (V) 77 is 21.0 [V] and the combined capacitance (C) 78 is 0.48 [μF].

On the other hand, when the capacitance of the variable capacitor (C2) 75 is the minimum value of 1.0 [μF], the combined withstand voltage (V) 77 is 3.0 [V] and the combined capacitance (C) 78 is 0.33 [μF], resulting in a change in combined capacitance 79 of 1.4 times.

Here, in Example 1 shown in column 71, the combined withstand voltage (V) 77 changes to around one third, the combined capacitance (C) 78 changes to around one quarter, and the change in combined capacitance 79 is 4.0 times.

In Example 2 shown in column 72, the combined withstand voltage (V) 77 does not significantly change, the combined capacitance (C) 78 changes to around one eighth, and the change in combined capacitance 79 is 8.5 times.

In Example 3 shown in column 73, the combined withstand voltage (V) 77 changes to around one seventh, the combined capacitance (C) 78 does not significantly change, and the change in combined capacitance 79 is 1.4 times.

In this way, when the change in capacitance of the variable capacitance elements is ten times, in Example 1 shown in column 71, it is possible to reduce the combined withstand voltage (V) 77 to around one third, to reduce the combined capacitance (C) 78 to around one quarter, and to achieve a large change in combined capacitance 79 of 4.0 times.

In Example 2 shown in column 72, it is possible to reduce the combined capacitance (C) 78 most largely to around one eighth and to achieve the largest change in combined capacitance 79 of 8.5 times.

In Example 3 shown in column 73, it is possible to reduce the combined withstand voltage (V) 36 to around one seventh, to leave the combined capacitance (C) 37 substantially unchanged, and to achieve a change in combined capacitance 79 of 1.4 times.

FIG. 10B is useful in explaining example designs where the change in capacitance of the variable capacitance elements is three times.

In Example 1 shown in column 81, the values given below are produced when the capacitance of the fixed capacitor (C1) 84 and the fixed capacitor (C3) 86 is fixed at 1.0 [µF] and the capacitance of the variable capacitor (C2) 85 changes in a range of 0.3 to 1.0 [µF].

That is, when the capacitance of the variable capacitor (C2) 85 is the maximum value of 1.0 [µF], the combined withstand voltage (V) 87 is 3.0 [V] and the combined capacitance (C) 88 is 0.33 [µF].

On the other hand, when the capacitance of the variable capacitor (C2) 85 is the minimum value of 0.3 [µF], the combined withstand voltage (V) 87 is 1.7 [V] and the combined capacitance (C) 88 is 0.20 [µF], resulting in a change in combined capacitance 89 of 1.7 times.

In Example 2 shown in column 82, the values given below are produced when the capacitance of the fixed capacitor (C1) 84 and the fixed capacitor (C3) 86 is fixed at 10.0 [µF] and the capacitance of the variable capacitor (C2) 85 changes in a range of 0.3 to 1.0 [µF].

That is, when the capacitance of the variable capacitor (C2) 85 is the maximum value of 1.0 [µF], the combined withstand voltage (V) 87 is 1.2 [V] and the combined capacitance (C) 88 is 0.83 [µF].

On the other hand, when the capacitance of the variable capacitor (C2) 85 is the minimum value of 0.3 [µF], the combined withstand voltage (V) 87 is 1.1[V] and the combined capacitance (C) 88 is 0.31 [µF], resulting in a change in combined capacitance 89 of 2.7 times.

In Example 3 shown in column 83, the values given below are produced when the capacitance of the fixed capacitor (C1) 84 and the fixed capacitor (C3) 86 is fixed at 1.0 [µF] and the capacitance of the variable capacitor (C2) 85 changes in a range of 3.3 to 10.0 [µF].

That is, when the capacitance of the variable capacitor (C2) 85 is the maximum value of 10.0 [µF], the combined withstand voltage (V) 87 is 21.0 [V] and the combined capacitance (C) 88 is 0.48 [µF].

On the other hand, when the capacitance of the variable capacitor (C2) 85 is the minimum value of 3.3 [µF], the combined withstand voltage (V) 87 is 7.7 [V] and the combined capacitance (C) 88 is 0.43 [µF], resulting in a change in combined capacitance 89 of 1.1 times.

Here, in Example 1 shown in column 81, the combined withstand voltage (V) 87 changes to around one half, the combined capacitance (C) 88 does not significantly change, and the change in combined capacitance 89 is 1.7 times.

In Example 2 shown in column 82, the combined withstand voltage (V) 87 does not significantly change, the combined capacitance (C) 88 changes to around one half, and the change in combined capacitance 89 is 2.7 times.

In Example 3 shown in column 83, the combined withstand voltage (V) 87 changes to around one third, the combined capacitance (C) 88 does not change, and the change in combined capacitance 89 is 1.1 times.

In this way, when the change in capacitance of the variable capacitance elements is three times, in Example 1 shown in column 81, it is possible to reduce the combined withstand voltage (V) 87 to around one half, to leave the combined capacitance (C) 88 unchanged, and to achieve a change in combined capacitance 89 of 1.7 times.

In Example 2 shown in column 82, it is possible to leave the combined withstand voltage (V) 87 substantially unchanged, to reduce the combined capacitance (C) 88 to around one half, and to achieve a large change in combined capacitance 89 of 2.7 times.

In Example 3 shown in column 83, it is possible to reduce the combined withstand voltage (V) 87 to around one third, to leave the combined capacitance (C) 88 significantly unchanged, and to leave the combined capacitance 89 substantially unchanged.

Note that the individual withstand voltages of all of the variable capacitors C are assumed to be "V".

Figures 11A, 11B:
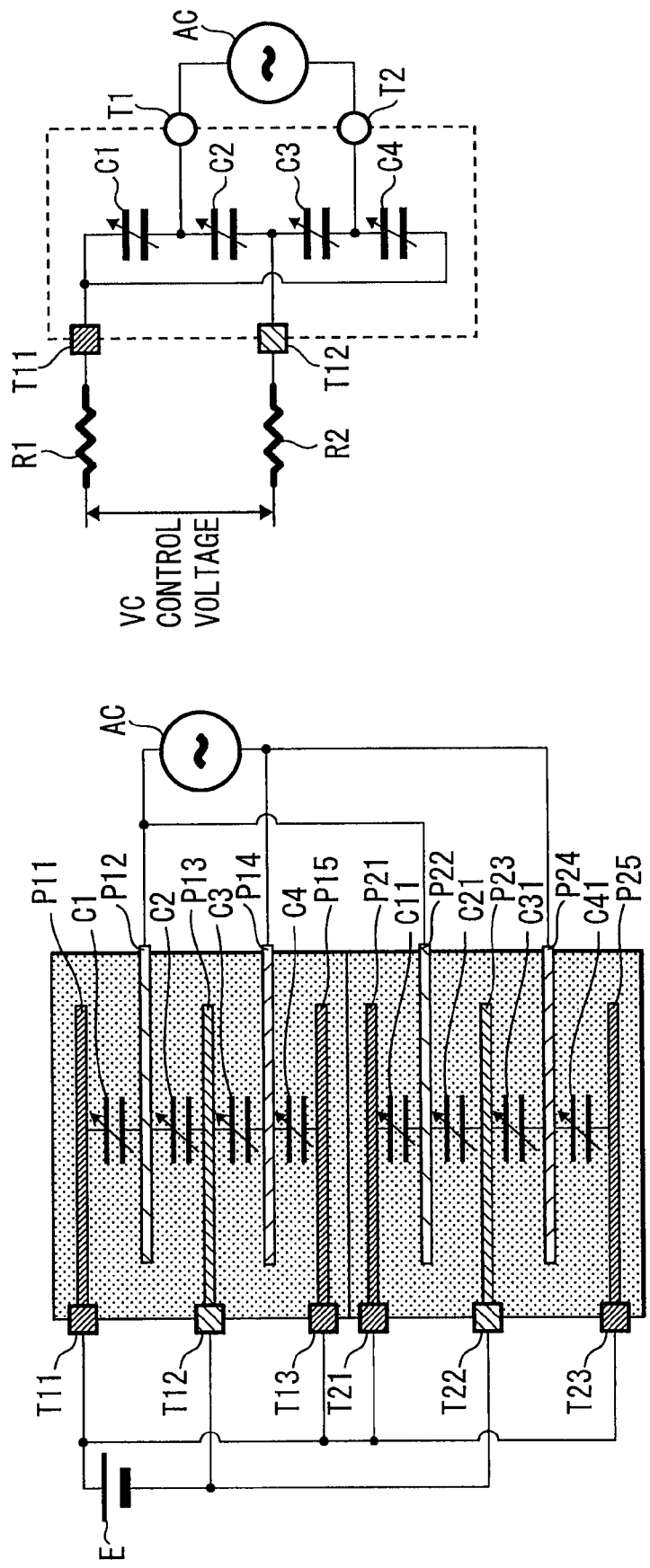
FIGS. 11A and 11B are diagrams useful in explaining one example construction of a four-element (i.e., variable capacitor ("1 VC")/variable capacitor ("1 VC")/variable capacitor ("1 VC")/variable capacitor ("1 VC")) basic unit of a power control apparatus according to another embodiment of the present invention, where

FIGS. 11A and 11B are diagrams useful in explaining one example construction of a four-element (i.e., variable capacitor ("1 VC")/variable capacitor ("1 VC")/variable capacitor ("1 VC")/variable capacitor ("1 VC")) basic unit of a power control apparatus according to another embodiment of the present invention, where FIG. 11A is a multilayer diagram and FIG. 11B is a circuit diagram.

In FIGS. 11A and 11B, the four-element construction is constructed of a variable capacitor C1 ("1 VC"), a variable capacitor C2 ("1 VC"), a variable capacitor C3 ("1 VC"), and a variable capacitor C4 ("1 VC") is shown.

Here, the first expression "1 VC" designates that the variable capacitor C1 used to control voltage is constructed of one capacitor, the next expression "1 VC" designates that the variable capacitor C2 used to control voltage is constructed of one capacitor, the next expression "1 VC" designates that the variable capacitor C3 used to control voltage is constructed of one capacitor, and the final expression "1 VC" designates that the variable capacitor C4 used to control voltage is constructed of one capacitor. The expression "1 VC/1 VC/1 VC/1 VC" designates that the construction is composed of four elements.

In the circuit diagram in FIG. 11B, a variable capacitance element of the variable capacitor C2 ("1 VC") is connected in series with another variable capacitance element of the variable capacitor C3 ("1 VC"), and an AC power supply voltage AC is supplied to terminals T1, T2 at both ends of the serially connected variable capacitors C2 ("1 VC") and C3 ("1 VC").

Also, a variable capacitance element of the variable capacitor C1 ("1 VC") is connected in series with another variable capacitance element of the variable capacitor C4 ("1 VC"), and the serially connected row composed of the variable capacitor C1 ("1 VC") and the variable capacitor C4 ("1 VC") and the serially connected row composed of the variable capacitor C2 ("1 VC") and the variable capacitor C3 ("1 VC") are connected in parallel.

The DC control voltage is supplied to the terminals T11, T12 at both ends of the variable capacitor C1 ("1 VC") and the variable capacitor C2 ("1 VC"). Because an AC voltage difference is produced across the terminals of the variable capacitor C1 ("1 VC") and the variable capacitor C2 ("1 VC"), the control circuit of the control voltage VC is connected to 10 KΩ resistors as the resistors R1, R2 to reduce the amount of unnecessary current that flows to the control circuit.

Here, with the four-element construction, the plus terminal T1 and the minus terminal T2 for the power supply voltage AC signal and the plus control terminal T11 and the minus control terminal T12 are constructed so as to be symmetrical. By doing so, it is possible to use the same construction even if the positions of the components are reversed between symmetrical positions.

When the four variable capacitors C1, C2, C3, C4 for controlling voltage are balanced, the power supply voltage AC signal and the control voltage VC signal will not interfere with one another.

By integrally laminating the basic unit construction shown by a dashed line in the circuit diagram shown in FIG. 11B, the variable capacitors C1, C2, C3, and C4 used to control voltage can be constructed so as to be incorporated in a single component.

In addition, by integrally laminating a plurality of the basic units shown by the dashed line in the circuit diagram shown in FIG. 11B in a multilayer structure, it is possible to adjust the capacitance of the four variable capacitors C1, C2, C3, and C4 that are used for controlling voltage in accordance with the number of laminated layers. When doing so, the variable capacitors C1, the variable capacitors C2, the variable capacitors C3, and the variable capacitors C4 of the laminated basic units are respectively connected in parallel.

In the multilayer diagram shown in FIG. 11A, in the first basic unit, the variable capacitor C1 that is used to control voltage is constructed of a dielectric between an electrode P11 and an electrode P12. Similarly, the variable capacitor C2 used for controlling voltage is constructed of a dielectric between the electrode P12 and an electrode P13, the variable capacitor C3 that is used to control voltage is constructed of a dielectric between the electrode P13 and an electrode P14, and the variable capacitor C4 that is used to control voltage is constructed of a dielectric between the electrode P14 and an electrode P15.

In a second basic unit that is laminated on the first basic unit, a variable capacitor C11 used for controlling the voltage is constructed of a dielectric between an electrode P21 and an electrode P22. Similarly, a variable capacitor C21 used for controlling voltage is constructed of a dielectric between the electrode P22 and an electrode P23.

A variable capacitor C31 used for controlling the voltage is constructed of a dielectric between the electrode P23 and an electrode P24. Similarly, a variable capacitor C41 used for controlling voltage is constructed of a dielectric between the electrode P24 and an electrode P25.

Here, the serially connected row composed of the variable capacitor C2 and the variable capacitor C3 of the first basic unit and the serially connected row composed of a variable capacitor C21 and a variable capacitor C31 of the second basic unit are connected in parallel.

Here, the serially connected row composed of the variable capacitor C1 and the variable capacitor C4 of the first basic unit and the serially connected row composed of a variable capacitor C11 and a variable capacitor C41 of the second basic unit are connected in parallel.

In addition, the AC power supply voltage AC is supplied to the electrode P12 and the electrode P14 at both ends of the serially connected row composed of the variable capacitor C2 and the variable capacitor C3 of the first basic unit. Similarly, the AC power supply voltage AC is supplied to the electrode P22 and the electrode P24 at both ends of the serially connected row composed of the variable capacitor C21 and the variable capacitor C31 of the second basic unit.

The DC control voltage E is supplied to the terminals T11, T12 of the electrode P11 and the electrode P13 across the serially connected row composed of the variable capacitor C1 and the variable capacitor C2 of the first basic unit. The DC control voltage E is also supplied to the terminals T13, T12 of the electrode P15 and the electrode P13 across the serially connected row composed of the variable capacitor C4 and the variable capacitor C3 of the first basic unit.

Similarly, the DC control voltage E is supplied to the terminals T21, T22 of the electrode P21 and the electrode P23 across the variable capacitor C11 and the variable capacitor C21 of the second basic unit. The DC control voltage E is also supplied to the terminals T23, T22 of the electrode P25 and the electrode P23 across the variable capacitor C41 and the variable capacitor C31 of the second basic unit.

The DC control voltage E is a voltage produced by subtracting the voltage drop due to the resistors R1, R2 from the control voltage VC.

Here, out of the first basic unit and the second basic unit that are integrally laminated, the variable capacitor C4 of the first basic unit and the adjacent variable capacitor C11 of the second basic unit are constructed so that the control terminal T13 of the fixed capacitor C4 and the control terminal T21 of the adjacent fixed capacitor C11 are at the same potential.

Here, this "same potential" is a potential of the plus side of the DC control voltage E used for control.

Accordingly, it is possible to arbitrarily increase the number of laminated basic units until the required capacitance is achieved and to adjust the capacitance according to the number of laminated units.

By doing so, it is possible to control the voltage or current of an AC signal by changing the capacitance of the variable capacitors using a control signal.

Figure 12:
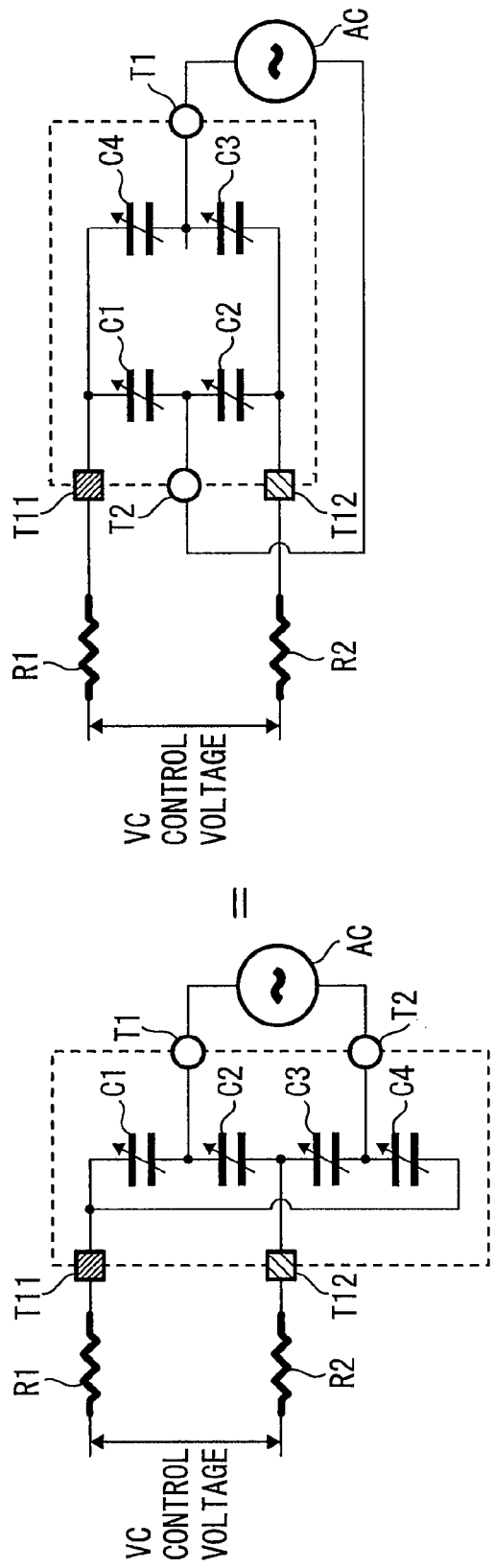
FIG. 12 is a diagram useful in describing a four-element (i.e., variable capacitor ("1 VC")/variable capacitor ("VC")/variable capacitor ("1 VC")/variable capacitor ("1 VC")) bridge construction.

FIG. 12 is a diagram useful in describing a four-element (i.e., variable capacitor ("1 VC")/variable capacitor ("VC")/variable capacitor ("1 VC")/variable capacitor ("1 VC")) bridge construction.

By redrawing the circuit diagram in FIG. 11B as shown in FIG. 12, it is possible to understand that the basic unit has the bridge construction of the four variable capacitors C1, C2, C3, C4 for controlling voltage.

If, for the sake of convenience, the capacitances of the variable capacitors C1, C2, C3, C4 are expressed as C1, C2, C3, C4, the four variable capacitors C1, C2, C3, C4 for controlling the voltage will be balanced when the cross-combined capacitances are equal such that C1×C3=C2×C4. Accordingly, in this state, the power supply voltage AC signal and the control voltage VC signal will not interfere with one another.

Figure 13A:
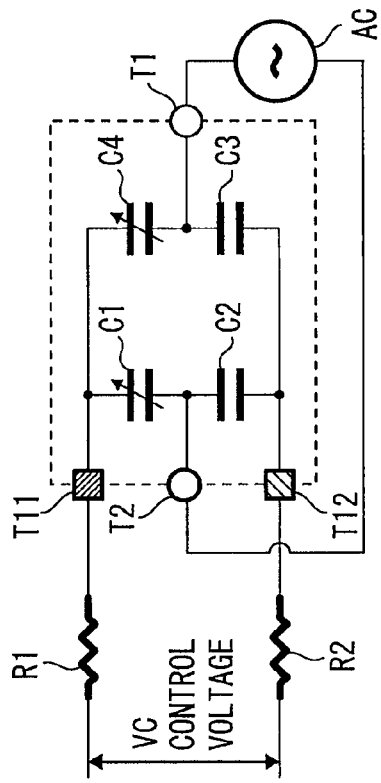
FIGS. 13A and 13B are diagrams useful in showing example constructions of Modifications 1 and 2 to the four-element (i.e., variable capacitor ("1 VC")/variable capacitor ("1 VC")/variable capacitor ("1 VC")/variable capacitor ("1 VC")) construction, where
Figure 13B:
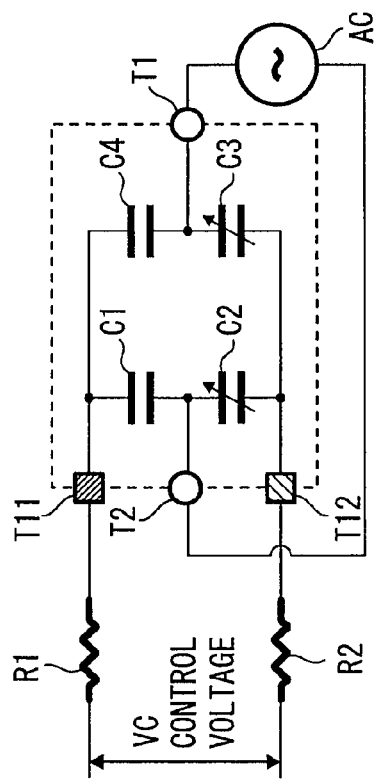

FIGS. 13A and 13B are diagrams useful in showing the example constructions of Modifications 1 and 2 to the four-element (i.e., variable capacitor ("1 VC")/variable capacitor ("1 VC")/variable capacitor ("1 VC")/variable capacitor ("1 VC")) construction described above, where FIG. 13A shows a four-element (i.e., fixed capacitor ("1 C")/variable capacitor ("1 VC")/variable capacitor ("1 VC")/fixed capacitor ("1 C")) construction and FIG. 13B shows a four-element (i.e., variable capacitor ("1 VC")/fixed capacitor ("1 C")/fixed capacitor ("1 C")/variable capacitor ("1 VC")) construction.

Here, with a four-element construction, all four elements do not need to be constructed of variable capacitors C1, C2, C3, C4.

It is also possible to use only the capacitors C1, C4 on the plus side of the power supply voltage AC signal as both DC removing capacitors and control capacitors.

In the four-element (i.e., fixed capacitor ("1 C")/variable capacitor ("1 VC")/variable capacitor ("1 VC")/fixed capacitor ("1 C")) construction shown in FIG. 13A, only the capacitors C1, C4 on the plus side of the power supply voltage AC signal are used as fixed capacitors and only the capacitors C2, C3 on the minus side are used as variable capacitors.

By doing so, the fixed capacitors C1, C4 can be used as DC removing capacitors and the part where the variable capacitors C2, C3 are connected in series can be used as control capacitors.

It is also possible to use only the capacitors C2, C3 on the minus side of the power supply voltage AC signal as both DC removing capacitors and control capacitors.

In the four-element (i.e., variable capacitor ("1 VC")/fixed capacitor ("1 C")/fixed capacitor ("1 C")/variable capacitor ("1 VC")) construction shown in FIG. 13B, only the capacitors C2, C3 on the minus side of the power supply voltage AC signal are used as fixed capacitors and only the capacitors C1, C4 on the plus side are used as variable capacitors.

By doing so, the fixed capacitors C2, C3 can be used as DC removing capacitors and the part where the variable capacitors C1, C4 are connected in series can be used as control capacitors.

Here, since the four elements can be rewritten as a bridge construction, the construction will be balanced when the cross-combined capacitances are equal such that C1×C3=C2×C4. Therefore, the capacitors C1, C4 may be fixed capacitors or conversely the capacitors C2, C3 may be fixed capacitors. However, using variable capacitors for all four of the capacitors C1, C2, C3, and C4 has an advantage in that the variable range of combined capacitance can be increased.

FIGS. 14A and 14B are tables useful in explaining example designs of a four-element construction, where FIG. 14A shows the case where the change in capacitance of the variable capacitance elements of a four element (variable capacitor ("1 VC")/variable capacitor ("1 VC")/variable capacitor ("1 VC")/variable capacitor ("1 VC")) construction is ten times and FIG. 14B shows the case where the change in capacitance of the variable capacitance elements of a four element (fixed capacitor ("1 C")/variable capacitor ("1 VC")/variable capacitor ("1 VC")/fixed capacitor ("1 C")) construction is ten times.

Example designs shown in FIG. 14A where the change in capacitance of the variable capacitance elements is ten times will now be described. In this example, all four of the capacitors C1, C2, C3, C4 shown in FIG. 11A are variable capacitors.

In Example 1 shown in column 111, the values given below are produced when the capacitances of a variable capacitor (C1) 114, a variable capacitor (C1) 115, a variable capacitor (C2) 116, and a variable capacitor (C3) 117 all change in a range of 0.1 to 1.0 [μF].

That is, when the capacitances of the variable capacitor (C1) 114 to the variable capacitor (C4) 117 are the maximum value of 1.0 [μF], the combined withstand voltage (V) 118 is 2.0 [V] and the combined capacitance (C) 119 is 1.00 [μF].

On the other hand, when the capacitances of the variable capacitor (C1) 114 to the variable capacitor (C4) 117 are the minimum value of 0.1 [μF], the combined withstand voltage (V) 118 is 2.0 [V] and the combined capacitance (C) 119 is 0.10 [μF], resulting in a change in combined capacitance 120 of 10.0 times.

In Example 2 shown in column 112, the values given below are produced when the capacitances of the variable capacitor (C1) 114 and the variable capacitor (C4) 117 change in a range of 0.1 to 10.0 [μF] and the capacitances of the variable capacitor (C2) 115 and the variable capacitor (C3) 116 change in a range of 0.1 to 1.0 [μF].

That is, when the capacitances of the variable capacitor (C1) 114 and the variable capacitor (C4) 117 are the maximum value of 10.0 [μF] and the capacitances of the variable capacitor (C2) 115 and the variable capacitor (C3) 116 are the maximum value of 1.0 [μF], the combined withstand voltage (V) 118 is 2.0 [V] and the combined capacitance (C) 119 is 1.82 [μF].

On the other hand, when the capacitances of the variable capacitor (C1) 114 and the variable capacitor (C4) 117 are the minimum value of 1.0 [μF], and the capacitances of the variable capacitor (C2) 115 and the variable capacitor (C3) 116 are the minimum value of 0.1 [μF], the combined withstand voltage (V) 118 is 2.0 [V] and the combined capacitance (C) 119 is 0.18 [μF], resulting in a change in combined capacitance 120 of 10.0 times.

In Example 3 shown in column 113, the values given below are produced when the capacitances of the variable capacitor (C1) 114 and the variable capacitor (C4) 117 change in a range of 0.1 to 1.0 [μF] and the capacitances of the variable capacitor (C2) 115 and the variable capacitor (C3) 116 change in a range of 1.0 to 10.0 [μF].

That is, when the capacitances of the variable capacitors (C1) 114 and the variable capacitor (C4) 117 are the maximum value of 1.0 [μF] and the capacitances of the variable capacitors (C2) 115 and the variable capacitor (C3) 116 are the maximum value of 10.0 [μF], the combined withstand voltage (V) 118 is 2.0 [V] and the combined capacitance (C) 119 is 1.82 [μF].

On the other hand, when the capacitances of the variable capacitor (C1) 114 and the variable capacitor (C4) 117 are the minimum value of 0.1 [μF], and the capacitances of the variable capacitor (C2) 115 and the variable capacitor (C3) 116 are the minimum value of 1.0 [μF], the combined withstand voltage (V) 118 is 2.0 [V] and the combined capacitance (C) 119 is 0.18 [μF], resulting in a change in combined capacitance 120 of 10.0 times.

Here, in Example 1 shown in column 111, the combined withstand voltage (V) 118 does not significantly change, the combined capacitance (C) 119 changes to around one tenth, and the change in combined capacitance 120 is 10.0 times.

In Example 2 shown in column 112, the combined withstand voltage (V) 118 does not significantly change, the combined capacitance (C) 119 changes to around one tenth, and the change in combined capacitance 120 is 10.0 times.

In Example 3 shown in column 113, the combined withstand voltage (V) 118 does not significantly change, the combined capacitance (C) 119 changes to around one tenth, and the change in combined capacitance 120 is 10.0 times.

When the change is ten times, in Example 1 shown in column 111, it is possible to leave the combined withstand voltage (V) 118 unchanged, to change the combined capacitance (C) 119 to around one tenth, and to achieve a large change in combined capacitance 120 of 10.0 times.

In Example 2 shown in column 112, it is possible to leave the combined withstand voltage (V) 118 unchanged, to change the combined capacitance (C) 119 to around one tenth, and to achieve the largest change in combined capacitance 120 of 10.0 times.

In Example 3 shown in column 113, it is possible to leave the combined withstand voltage (V) 118 unchanged, to change the combined capacitance (C) 119 to around one tenth, and to achieve the largest change in combined capacitance 120 of 10.0 times.

In this way, with this four variable element bridge construction, the withstand voltage, capacitance, and range of variable capacitance are always maintained.

Note that the individual withstand voltages of all of the variable capacitors C are assumed to be "V". However, it is always necessary for the bridge condition C1×C3=C2×C4 to be satisfied.

Example designs shown in FIG. 14B where the change in capacitance of the variable capacitance elements is ten times will now be described. In these examples, fixed capacitors are used as the capacitors C1, C4 as shown in FIG. 13A.

In Example 1 shown in column 121, the values given below are produced when the capacitances of the fixed capacitor (C1) 124 and the fixed capacitor (C1) 127 are fixed at 1.0 [μF] and the capacitances of the variable capacitor (C2) 125 and the variable capacitor (C3) 126 change in a range of 0.1 to 1.0 [μF].

That is, when the capacitances of the variable capacitor (C2) 125 and the variable capacitor (C3) 126 are the maximum value of 1.0 [μF], the combined withstand voltage (V) 128 is 2.0 [V] and the combined capacitance (C) 129 is 1.0 [μF].

On the other hand, when the capacitances of the variable capacitor (C2) 125 and the variable capacitor (C3) 126 are the minimum value of 0.1 [μF], the combined withstand voltage (V) 128 is 2.0 [V] and the combined capacitance (C) 129 is 0.18 [μF], resulting in a change in combined capacitance 130 of 5.5 times.

In Example 2 shown in column 122, the values given below are produced when the capacitances of the fixed capacitor (C1) 124 and the fixed capacitor (C4) 127 are fixed at 10.0 [μF] and the capacitances of the variable capacitor (C2) 125 and the variable capacitor (C3) 126 change in a range of 0.1 to 1.0 [μF].

That is, when the capacitances of the variable capacitor (C2) 125 and the variable capacitor (C3) 126 are the maximum value of 1.0 [μF], the combined withstand voltage (V) 128 is 2.0 [V] and the combined capacitance (C) 129 is 1.82 [μF].

On the other hand, when the capacitances of the variable capacitor (C2) 125 and the variable capacitor (C3) 126 are the minimum value of 0.1 [μF], the combined withstand voltage (V) 128 is 2.0 [V] and the combined capacitance (C) 129 is 0.20 [μF], resulting in a change in combined capacitance 130 of 9.2 times.

In Example 3 shown in column 123, the values given below are produced when the capacitances of the fixed capacitor (C1) 124 and the fixed capacitor (C4) 127 are fixed at 1.0 [μF] and the capacitances of the variable capacitor (C2) 125 and the variable capacitor (C3) 126 change in a range of 1.0 to 10.0 [μF].

That is, when the capacitances of the variable capacitor (C2) 125 and the variable capacitor (C3) 126 are the maximum value of 10.0 [μF], the combined withstand voltage (V) 128 is 2.0 [V] and the combined capacitance (C) 129 is 1.82 [μF].

On the other hand, when the capacitances of the variable capacitor (C2) 125 and the variable capacitor (C3) 126 are the minimum value of 1.0 [μF], the combined withstand voltage (V) 128 is 2.0 [V] and the combined capacitance (C) 129 is 1.00 [μF], resulting in a change in combined capacitance 130 of 1.8 times.

Here, in Example 1 shown in column 121, it is possible to leave the combined withstand voltage (V) 128 substantially unchanged, to reduce the combined capacitance (C) 129 to around one sixth, and to achieve a change in combined capacitance 130 of 5.5 times.

In Example 2 shown in column 122, it is possible to leave the combined withstand voltage (V) 128 substantially unchanged, to reduce the combined capacitance (C) 129 to around one tenth, and to achieve a change in combined capacitance 130 of 9.2 times.

In Example 3 shown in column 123, it is possible to leave the combined withstand voltage (V) 128 substantially unchanged, to reduce the combined capacitance (C) 129 to around one half, and to achieve a change in combined capacitance 130 of 1.8 times.

In this way, when two of the elements are fixed and the change in variable capacitance of the other two elements is ten times, in Example 1 shown in column 121, it is possible to leave the combined withstand voltage (V) 128 unchanged, to reduce the combined capacitance (C) 129 to around one sixth, and to achieve a large change in combined capacitance 130 of 5.5 times.

In Example 2 shown in column 122, it is possible to leave the combined withstand voltage (V) 128 unchanged, to reduce the combined capacitance (C) 129 to around one tenth, and to achieve a large change in combined capacitance 130 of 9.2 times.

In Example 3 shown in column 123, it is possible to leave the combined withstand voltage (V) 128 unchanged, to reduce the combined capacitance (C) 129 to around one half, and to achieve a change in combined capacitance 130 of 1.8 times.

Although the present invention has been described by way of the embodiments given above, it should be obvious that various modifications can be made without departing from the scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A power control apparatus comprising:
an input terminal and an output terminal to connect to an AC source;
a DC removing capacitor connected between the input terminal and a control terminal to remove DC currents flowing between the input terminal and the output terminal; and
a variable capacitor connected between the control terminal and the output terminal, a capacitance of the variable capacitor varying according to a control signal continuously applied between the control terminal and the output terminal, one of a current and a voltage of an AC signal supplied by the AC source being controlled by changing the capacitance of the variable capacitor using the control signal,
wherein dielectrics that form the DC removing capacitor and the variable capacitor as a serially connected row of capacitors are integrally laminated, and the DC removing capacitor and the variable capacitor are connected in series between the input terminal and the output terminal, and
wherein a thickness between the dielectrics that form the row of capacitors and a distance between electrodes of the dielectrics are changed to change a combined capacitance, a withstand voltage, and a variable range of the combined capacitance of the DC removing capacitor and the variable capacitor.

2. A power control apparatus according to claim 1, wherein the combined capacitance, the withstand voltage, and the variable range of the combined capacitance of the DC removing capacitor and the variable capacitor are changed by respectively connecting at least one other DC removing capacitor and at least one other variable capacitor to the DC removing capacitor and the variable capacitor in parallel.

3. A power control apparatus according to claim 2, wherein the row of capacitors has a two-element construction including the DC removing capacitor and the variable capacitor connected in series,
a capacitance of the DC removing capacitor proportionally increases with relative to the at least one other DC removing capacitor connected in parallel, and
a capacitance of the variable capacitor is proportionally increased by the at least one other variable capacitor connected in parallel.

4. A power control apparatus according to claim 2, wherein the row of capacitors has a three-element construction where a plus-side DC removing capacitor, the variable capacitor, and a minus-side DC removing capacitor are connected in series, and a capacitance of the variable capacitor is proportionally increased by connecting other variable capacitors in parallel thereto.

5. A power control apparatus according to claim 2, wherein the row of capacitors has a three-element construction where a plus-side DC removing capacitor, the variable capacitor, and a minus-side DC removing capacitor are connected in series,
- a capacitance of the plus-side DC removing capacitor is proportionally increased by connecting other DC removing capacitors in parallel thereto, and
- a capacitance of the minus-side DC removing capacitor is proportionally increased to by connecting other DC removing capacitors in parallel thereto.

6. A power control apparatus according to claim 2, wherein the row of capacitors has a four-element bridge construction where the variable capacitors are connected in series, capacitances of four elements are adjusted such that capacitances of two pairs of balancing elements out of the four elements are equal, and two out of the four elements are used as the DC removing capacitor, capacitances thereof are fixed, and capacitances of another two out of the four elements are variable.

* * * * *